(12) United States Patent
Sandhu et al.

(10) Patent No.: US 7,065,642 B2
(45) Date of Patent: Jun. 20, 2006

(54) SYSTEM AND METHOD FOR GENERATION AND USE OF ASYMMETRIC CRYPTO-KEYS EACH HAVING A PUBLIC PORTION AND MULTIPLE PRIVATE PORTIONS

(75) Inventors: Ravi Sandhu, Fairfax, VA (US); Colin deSa, Herndon, VA (US); Karuna Ganesan, Norcross, GA (US)

(73) Assignee: TriCipher, Inc., San Mateo, CA (US)

( * ) Notice: Subject to any disclaimer, the term of this patent is extended or adjusted under 35 U.S.C. 154(b) by 726 days.

(21) Appl. No.: 09/739,111

(22) Filed: Dec. 19, 2000

(65) Prior Publication Data

US 2002/0078344 A1   Jun. 20, 2002

(51) Int. Cl.
*H04L 9/00* (2006.01)
(52) U.S. Cl. .................. 713/155; 713/168; 713/176; 713/180; 713/181; 726/3; 726/4; 726/5; 726/27; 726/28; 726/29; 726/30; 380/30; 380/44; 380/45; 380/279; 380/282
(58) Field of Classification Search ............... 713/155, 713/168, 176, 180–201; 380/30, 44, 45, 380/277–279, 382

See application file for complete search history.

(56) References Cited

U.S. PATENT DOCUMENTS

| 5,748,735 | A | * | 5/1998 | Ganesan ................. 713/165 |
| 5,825,880 | A | * | 10/1998 | Sudia et al. ............. 713/180 |
| 6,026,163 | A | * | 2/2000 | Micali ..................... 705/80 |
| 6,094,575 | A | | 7/2000 | Anderson et al. |
| 6,263,447 | B1 | * | 7/2001 | French et al. ............ 713/201 |

OTHER PUBLICATIONS

Denning, D., "A Taxonomy for Key Escrow Encryption Systems", ACM Inc., Mar. 1996, vol. 39, No. 3, entire document, www.cosc.georgetown.edu/~denning/crypto/Taxonomy.html.*
Denning, D., "Descriptions of Key Escrow Systems", ACM Inc., Feb. 26, 1997, entire document, www.cosc.georgetown.edu/~denning/crypto/Appendix.html.*
Abelson, H., et al., "The Risks Of 'Key Recovery,' 'Key Escrow,' And 'Trusted Third Party Encryption'", CDT.org, 1998, entire document, www.cdt.org/crypto/risks98/.*

* cited by examiner

*Primary Examiner*—Ayaz Sneikh
*Assistant Examiner*—Ronald Baum
(74) *Attorney, Agent, or Firm*—Antonelli, Terry, Stout & Kraus, LLP

(57) ABSTRACT

A system for authentication of network users which is operable in multiple modes, includes a plurality of user network stations and at least one sponsor network station representing a sponsor. Each network station represents a user associated with an asymmetric crypto-key having either a first or second number of private portions, the second number being greater than the first number. The one or more sponsor network stations receive authentication requests from the user network stations, determine the identity of a user associated with each of the received authentication requests, select from two or more available modes of operation based upon the determined identity. If operation in one mode is selected, the sponsor network station signs a particular received authentication request using one private portion of an asymmetric crypto-key having a first number of private portions. However, if another mode is selected, the sponsor network station signs that particular authentication request using one private portion of an asymmetric crypto-key having a second number of private portions.

13 Claims, 15 Drawing Sheets

SYSTEM AND METHOD FOR GENERATION AND USE OF ASYMMETRIC CRYPTO-KEYS EACH HAVING A PUBLIC PORTION AND MULTIPLE PRIVATE PORTIONS

TECHNICAL FIELD

This invention relates to cryptosystems. More particularly, the present invention relates to crypto-key generation and use in cryptosystems.

BACKGROUND ART

Today, computing devices are almost always interconnected via networks. As these networks can be large closed networks, as within a corporation, or truly public networks as the Internet is, the network itself might have hundreds, thousands or even millions of potential users. Consequently it is often required to restrict access to any given computer or service, or a part of a computer or service to a subset of the users on the public or closed network. For instance, a brokerage might have a public website accessible to all, but would like to only give Ms. Alice Smith access to Ms. Alice Smith's brokerage account.

This is an old problem, tracing its roots to the earliest days of computers, and passwords were among the first techniques used, and to this day remain the most widely used technique for protecting resources on a computer or service.

In its simplest form, every user has a unique password and the computer has knowledge of the user password. When attempting to log on Alice would enter her userid, say alice, and password, say apple23, the computer would compare the pair, i.e. alice, apple23, with the pair it had stored for Alice, and if there is a match would establish a session and give Alice access.

This simple scheme suffers from two problems. First, the table containing the passwords is stored on the computer, and represents a single point of compromise. If Eve could somehow steal this table, she would be able to access every user's account. A second problem with this approach is that when Alice enters her password it travels from her terminal to the computer in the clear, and Eve could potentially eavesdrop. For instance the "terminal" could be Alice's PC at home, and the computer could be a server on the Internet, in which case her password travels in the clear on the Internet.

Various solutions have been proposed and implemented to solve these two issues. For instance, to solve the first problem of storing the password on the computer, the computer could instead store a one way function of the password. E.g. F(apple23)=XD45 DTY, and the pair {alice, XD45DTY}. In this example as F( ) is a one way function, computing XD45DTY from apple23 is easy, but as it is a "one way function", the reverse is believed to be difficult or close to impossible. So when Alice logs on and sends the computer {alice, apple23}, the computer can compute F(apple23) and compare the result with XD45DTY. The UNIX operating system was among the first to implement such a system in the late 1970's.

Before discussing more sophisticated conventional techniques for solving this problem, let us briefly describe symmetric, asymmetric and 'split private key' cryptography.

In symmetric key cryptography, the two parties who want to communicate in private share a common secret key, say K. the sender encrypts messages with K, to generate a cipher, i.e. C=Encrypt (M,K). The receiver decrypts the cipher to retrieve the message, i.e. D=Decrypt(C,K). An attacker who does not know K, and sees C, cannot successfully decrypt the message, if the underlying algorithms are strong. Examples of such systems are DES and RC4. Encryption and decryption with symmetric keys provide a confidentiality, or privacy service.

Symmetric keys can also be used to provide integrity and authentication of messages in a network. Integrity and authentication means that the receiver knows who sent a message and that the message has not been modified so it is received as it was sent. Integrity and authentication is achieved by attaching a Message Authentication Code (MAC) to a message M. E.g., the sender computes S=MAC (M,K) and attaches S to the message M. When the message M reaches the destination, the receiver also computes S'=MAC(M,K) and compares S' with the transmitted value S. If S'=S the verification is successful otherwise verification fails and the message should be rejected. Early MACs were based on symmetric encryption algorithms such as DES whereas more recently MACs are constructed from message digest functions, or "hash" functions, such as MD5 and SHA-1. The current Internet standard for this purpose is known as hash-based MAC (HMAC).

By combining confidentiality with integrity and authentication, it is possible to achieve both services with symmetric key cryptography. It is generally accepted that different keys should be used for these two services and different keys should be used in different directions between the same two entities for the same service. Thus if Alice encrypts messages to Bob with a shared key K, Bob should use a different shared key K' to encrypt messages from Bob to Alice. Likewise Alice should use yet another key K" for MACs from Alice to Bob and Bob should use K'" for MACs from Bob to Alice. Since this is well understood by those skilled in the art, we will follow the usual custom of talking about a single shared symmetric key between Alice and Bob, with the understanding that strong security requires the use of four different keys.

Symmetric key systems have been in use for literally thousands of years, and have always suffered from a major problem—namely how to perform key distribution. How do Bob and Alice agree on K? Asymmetric key cryptography was invented to solve this problem. Here every user is associated with two keys, which are related by special mathematical properties. These properties result in the following functionality: a message encrypted with one of the two keys can then only be decrypted with the other.

One of these keys for each user is made public and the other is kept private. Let us denote the former by E, and the latter by D. So Alice knows Dalice, and everyone knows Ealice. To send Alice the symmetric key K, Bob simply sends C=Encrypt(K,Ealice). Alice, and only Alice (since no one else knows Dalice), can decrypt the ciphertext C to recover the message, i.e. Decrypt(C,Dalice)=K. Now both Alice and Bob know K and can use it for encrypting subsequent messages using a symmetric key system. Why not simply encrypt the message itself with the asymmetric system? This is simply because in practice all known asymmetric systems are fairly inefficient, and while they are perfectly useful for encrypting short strings such as K, they are inefficient for large messages.

The above illustrates how asymmetric cryptography can solve the key distribution problem. Asymmetric cryptography can also be used to solve another important problem, that of digital signatures. To sign a message M, Alice encrypts it with her own private key to create S=Encrypt (M,Dalice). She can then send (M,S) to the recipient who can then decrypt S with Alice's public key to generate M', i.e. M'=Decyrpt(S,Ealice). If M'=M then the recipient has a valid signature as only someone who has Dalice, by definition only Alice, can generate S, which can be decrypted with Ealice to produce M. To convey the meaning of these cryptographic operations more clearly they are often written as S Sign(M,Dalice) and M'=Verify(M,S,Ealice). It is worth noting that asymmetric key digital signatures provide non-repudiation in addition to the integrity and authentication achieved by symmetric key MACs. With MACs the verifier can compute the MAC for any message M of his choice since the computation is based on a shared secret key. With digital signatures this is not possible since only the sender has knowledge of the sender's private key required to compute the signature. The verifier can only verify the signature but not generate it.

The RSA cryptosystem is one system that implements asymmetric cryptography as described above. In particular the RSA cryptosystem allows the same public-private key pair to be used for encryption and for digital signatures. It should be noted there are other asymmetric cryptosystems which implement encryption only e.g., ElGamal or digital signature only, e.g., DSA.

Finally, the above description does not answer the important question of how Bob gets Alice's public key Ealice. The process for getting and storing the binding [Alice, malice] which binds Ealice to Alice is tricky. The most practical method appears to be to have the binding signed by a common trusted authority. So such a "certificate authority" (CA) can create CERTalice=Sign([Alice, Ealice], Dca). Now CERTalice can be verified by anyone who knows the CA's public key Eca. So in essence, instead of everyone having to know everyone else's public key, everyone only need know a single public key, that of the CA. More elaborate schemes with multiple Certificate Authorities, sometimes having a hierarchical relationship, have also been proposed.

Asymmetric key cryptosystems have been around for a long time, but have found limited use. The primary reasons are twofold: (a) the private key D in most systems is long, which means that users cannot remember them, and they have to either be stored on every computer they use, or carried around on smart cards or other tokens; and (b) the infrastructure for ensuring a certificate is valid, which is critical, is cumbersome to build, operate and use. The first technique proposed to validate certificates was to send every recipient a list of all certificates that had been revoked. This clearly does not scale well to an environment with millions of users. The second method proposed was to require that one inquire about the validity of a certificate on-line, which has its own associated problems.

A system based on split private key cryptography has been developed to solve these two issues, among others. In this system the private key for Alice, i.e. Dalice, is further split into two parts, Daa which Alice knows, and a part Das which is stored at a security server. To sign a message, Alice could perform a partial encryption to generate a partial signature, i.e. PS=Sign(M,Das). Alice then sends the server PS which 'completes' the signature by performing S=Sign (PS,Dss). This completed signature S is indistinguishable from one generated by the original private key, so the rest of the process works as previously described. However, Daa can be made short, which allows the user to remember it as a password, so this system is consumer friendly. Further, if the server is informed that a particular ID has been revoked, then it will cease to perform its part of the operation for that user, and consequently no further signatures can ever be performed. This provides for instant revocation in a simple highly effective fashion.

Let us return now to password based systems. Challenge-response systems solve the issue of having to send passwords in the clear across a network. If the computer and Alice share a secret password, P, then the computer can send her a new random challenge, R, at the time of login. Alice computes C=Encrypt(R,P) and sends back C. The computer decrypts Decrypt(C,P)=C'. If C=C', then the computer can trust that it is Alice at the other end. Note however that the computer had to store P. A more elegant solution can be created using asymmetric cryptography. Now Alice has a private key Dalice, or in a split private key system she has Daa. The computer challenges her to sign a new random challenge R. She signs the challenge, or in the split private key system she interacts with the security server to create the signature, and sends it back to the computer which uses her public key, retrieved from a certificate, to verify the signature. Observe that the computer does not have to know her private key, and that an eavesdropper observing the signature on R gains no knowledge of her private key.

The SSL system, which is widely used on the Internet in effect implements a more elaborate method of exactly this protocol. SSL has two components, 'server side SSL' in which a server proves its identity by signing a particular message during connection set-up. As browsers such as Netscape and Microsoft Internet Explorer come loaded with the public keys of various CAs, the browser can verify the signature of the server. This authenticates the server to the client, and also allows for the set-up of a session key K, which is used to encrypt all further communications. Server side SSL is widely used, as the complexity of managing certificates rests with system administrators of web sites who have the technical knowledge to perform this function. The converse function in SSL, client side SSL, which lets a client authenticate herself to a server is rarely used, because although the technical mechanism is exactly the same, it now requires users to manage certificates and long private keys which has proven to be difficult, unless they use the split private key system. So in practice, most Internet web sites use server side SSL to authenticate themselves to the client, and to obtain a secure channel, and from then on use Userid, Password pairs to authenticate the client.

So far from disappearing, the use of passwords has increased dramatically. Passwords themselves are often dubbed as inherently "weak" which is inaccurate, because if they are used carefully passwords can actually achieve "strong" security. As discussed earlier passwords should not be sent over networks, and if possible should not be stored on the receiving computer. Instead, in a "strong" system, the user can be asked to prove knowledge of the password without actually revealing the password. And perhaps most critically passwords should not be vulnerable to dictionary attacks.

Dictionary attacks can be classified into three types. In all three cases the starting point is a 'dictionary' of likely passwords. Unless the system incorporates checks to prevent it, users tend to pick poor passwords, and compilations of lists of widely used poor passwords are widely available.

1) On line dictionary attack. Here the attacker types in a guess at the password from the dictionary. If the attacker is granted access to the computer they know the guess was correct. These attacks are normally prevented by locking the user account if there are an excessive number of wrong tries. Note that this very commonly used defense prevented one problem, but just created another one. An attacker can systematically go through and lock out the accounts of hundreds or thousands users. Although the attacker did not gain access, now legitimate users cannot access their own accounts either, creating a denial of service problem.

2) Encrypt dictionary attacks: If somewhere in the operation of the system a ciphertext C=Encrypt(M,P) was created, and the attacker has access to both C and M, then the attacker can compute off-line C1=Encrypt(M,G1), C2=Encrypt(M,G2), . . . where G1, G2, . . . etc. are the guesses at the password P from the dictionary. The attacker stops when he finds a Cn=C, and knows that Gn=P. Observe that the UNIX file system, which uses a one way function F( ) instead of an encryption function E( ), is vulnerable to this attack.

3) Decrypt dictionary attacks: Here the attacker, does not know M, and only sees the ciphertext C (where C=Encrypt (M, P). The system is only vulnerable to this attack IF it is true that M has some predictable structure. So the attacker tries M1=Decrypt(C,G1), M2=Decrypt(C, G2) . . . , and stops when the M1 has the structure he is looking for. For instance M1 could be known to be a timestamp, English text, or a number with special properties such as a prime, or a composite number with no small factors.

It is possible to design strong password based systems but the password should not be stored on the computer in any form, ever communicated to it, and should be protected from all three types of dictionary attacks.

FIG. 1 depicts the operations of Server-Side-Authentication during a communications session between network users, in this instance a client device such as a personal computer and a host device such as a server. It will be understood that software is resident on the client device and this software directs communications on the client side of the communication session. It will also be understood that software is resident on the server and that this software directs communications on the server side of the communication session. Furthermore, it should be understood that while in this example the server is associated with a merchant, the server could be associated with any type of entity. As used here, server designates any networked device capable of presenting information to another network device via the network. Also, it should be understood that while the client device in this example is associated with an individual user, the client device may be associated with an entity other than an individual user. Also, a client device may be any networked device capable of accessing information via a network.

At step 100 the client device transmits a message to the server. This message includes a first random number generated by the software and an indication of the types of cryptography the client device is capable of supporting. This message can be called a 'hello' message. The server then selects one of the types of cryptography and includes a second random number and the server's certificate in a transmission to the client device, step 110. This transmission can be called 'message two'. A certificate contains information certifying that an entity is who that entity claims to be. The client device then obtains the public portion of the server's asymmetric key from the certificate and verifies the certificate by verifying the certificate issuer's signature on the certificate, step 115. The client device then generates and encrypts a symmetric session key with the public portion of the server's asymmetric key and transmits the encrypted symmetric session key to the server, step 120. The server then decrypts the symmetric session key with the private portion of the server's asymmetric key and encrypts the first random number using the symmetric key and transmits the encrypted random number to the client device, step 125. The client device then decrypts the random number using its copy of the symmetric key, step 130. If the original first random number is recovered, the server has authenticated itself to the client device. All further communication between the server and client device are secured using the symmetric session key. It will be recognized that SSL server-side-authentication in current use does not actually follow steps 125 and 130. Rather these steps are representative of how the shared symmetric key could be used for server to client authentication.

Client-Side-Authentication is designed to operate similar to Server-Side-Authentication as is depicted in FIG. 2. At step 200, the server transmits a 36 byte hash to the client device and requests the client device to sign it with the private portion of the client device's asymmetric key. Also, the server will request that the client device return the client device's certificate. The client device signs the 36 byte hash and sends the signed 36 byte hash and the client device certificate to the server, step 210. The server then verifies that the client device's certificate is valid and obtains the public portion of the browser's asymmetric key from the authority issuing the certificate, step 215. The server then uses the public portion of the client device's asymmetric crypto-key to verify the client device signature, step 220. If the server recovers the original 36 byte hash, the client device has authenticated itself to the server. It will be recognized here also that SSL client-side-authentication currently in use does not actually follow these precise steps. Rather these steps are representative of how the user's asymmetric public and private keys could be used for client to server authentication.

In practice, only Server-Side-Authentication is generally implemented today. Most servers which require authentication of other network users utilize passwords. As discussed above, after Server-Side-Authentication is completed, both the server and the client device are in possession of a symmetric session key. All subsequent communications between the parties during the present communication session are secured with the symmetric session key. Typically, the server requests the client device to supply a valid user ID and password. This information is provided by the user and transmitted from the client device to the server, encrypted with the symmetric session key. Each server must maintain a database of associated users. These databases contain passwords and information identifying the holders of the passwords. This requires the server to gather or dispense passwords and to manage stored passwords. If the password is valid, that is, it is included in the database, the client device has authenticated itself to the server.

Accordingly, a need exists for a technique whereby a first network user can obtain verifiable authentication from a second network user without the first network user having to maintain, process and utilize a password system.

A certificate issuing authority includes information about the user in the user's certificate. This information may include associations the user maintains, personal information, or even financial information. A certificate issuing authority may include information that a user does not want disclosed. Or, user information included in a certificate may change. Presently, a user cannot update or change information in an issued certificate. A user can at best revoke a certificate and obtain a new one which includes the changed information. When a new certificate is obtained, new keys must be generated. Any entity who has previously obtained the user's certificate and public key must now reobtain the new certificate and key. Thus, there is no way to modify a certificate without revoking the corresponding key pair.

Accordingly, a need exists whereby a certificate can be modified, while retaining the associated key pair.

A single user may have associations with multiple servers. Each of the multiple servers may require the user to maintain a password and client ID. Thus, a single user may be required to remember a plurality of passwords.

Oftentimes a user may attempt to establish the same client ID and password with several unrelated servers. This cannot always be accomplished. Some servers require a password to meet certain quality standards not be a 'bad' password, as discussed above. Thus a password that the user may wish to use may not be acceptable to certain servers. Also, a password that a user may wish to use may already be in use by another user of a server, and the server may not allow more than one user to use the same password.

Even if a user is able to use the same client ID and password for access to multiple servers, other problems with using passwords for authentication arise. For instance, a user's password may become compromised. That is, the password may become known to another individual. That individual can then impersonate the user to multiple servers. The user must obtain a new password with each server with which the user uses the now compromised password. Furthermore, if a user's password is compromised and a first server recognizes this fact, there is currently no method whereby this first server can notify other servers at which the user uses this same password that the password has been compromised.

Yet another problem with the use of passwords in providing authentication is that a user must provide a password to each and every server requiring authentication. If a user is fortunate enough to obtain the same password with several servers, the user still must provide the password to each server to which the user seeks access. Thus, every time a user wishes to perform communications with a server, that user must cause his or her password to be transmitted to the server. Furthermore, when a user ends an authenticated communication with a server and immediately attempts to reestablish an authenticated communication, the user must again provide his or her password to the server for authentication.

Accordingly, a need exists for a technique whereby a network user can utilize a single password to access a plurality of networked devices and enter that single password only once to gain access to any of the plurality of networked devices.

SSL as deployed in current systems is based upon the RSA public key cryptosystem. As introduced above, RSA relies upon the use of products of large prime numbers which are not easily factorable. If the RSA technique should be broken, that is, if an algorithm for factoring large prime numbers is found, SSL and any cryptosystem based on RSA would be useless. An attacker would have access to communications in any RSA based cryptosystem. Secure and trusted communications in SSL and other public key cryptosystems would become impossible. Accordingly, a need exists for a technique whereby a public key based cryptosystem could provide secure communications if RSA were to become unusable.

OBJECTIVES OF THE INVENTION

It is an object of the present invention to provide a system and method for improving conventional public cryptosystems to afford short passwords an increased level of security.

It is another object of the present invention to provide a system and method for improving conventional public cryptosystems such that the identity of a user can be verified without the use of passwords known to the verifier.

It is a further object of the present invention to provide a system and method whereby a single identification identifies a user to a plurality of network devices.

It is a further object of the present invention to provide a system and method for improving conventional public cryptosystems to allow modification of existing certificates without revoking the associated key pair.

It is still a further object of the present invention to provide a system and method whereby a user can gain access to plurality of networked devices controlled by different entities by only once providing identifying information.

It is still a further object of the present invention to provide a system and method for improving conventional asymmetric cryptosystems, such as RSA, to be able to resort to symmetric cryptography should the RSA algorithm be broken. Additional objects, advantages, novel features of the present invention will become apparent to those skilled in the art from this disclosure, including the following detailed description, as well as by practice of the invention. While the invention is described below with reference to preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

SUMMARY DISCLOSURE OF THE INVENTION

According to the invention, techniques for generation and use of asymmetric crypto-keys are provided. A system and method for authentication of network users operable in multiple modes is provided. The system includes a plurality of network stations, each associated with an asymmetric crypto-key. The network may be a private network, a public network, such as the Internet, or a wireless network. A network station may be any device capable of performing computing tasks, such as a networked personal digital assistant, digital telephone, personal computer, high powered workstation, network server, or mainframe computer.

An asymmetric crypto-key is a key used to transform messages, such as to encrypt a message, decrypt a message, or form a digital signature on a message. An asymmetric crypto-key has a public portion and at least one private portion. The public portion is widely known or available. If an asymmetric crypto-key has only one private portion, that private portion is known only to a user or device with which that asymmetric crypto-key is associated. If an asymmetric crypto-key has multiple private portions, at least one of these portions is known to the user or device with which this asymmetric crypto-key is associated, and the other portion or portions is/are known to at least one other entity. For single private portion asymmetric crypto-keys, a message encrypted with the public portion can be decrypted with the private portion, and vice-versa. A message signed with the private portion can be authenticated with the public portion.

When an asymmetric crypto-key has more than one private portion, each private portion is used to transform a message.

A plurality of network stations, each representing a network user, are each known as a user network station. Each of these user network stations are associated with a different asymmetric crypto-key. A network user may be an individual, an organization, or even a networked device. Each of these asymmetric crypto-keys associated with a user network station have either a first number of private portions or a second number of private portions. The first number of private portions may be one portion, or more than one portion. The second number of private portions is greater than the first number of private portions.

The system also includes at least one sponsor network station. A sponsor network station is associated with a network user known as a sponsor. A sponsor may be the entity which generates and/or distributes asymmetric crypto-keys. Also, a sponsor may be an entity controlling access to services or information available on the network, or access to other network stations. Each sponsor station is configured to receive a plurality of authentication requests from the plurality of user network stations. An authentication request is a request to validate, vouch for, or otherwise confirm the identity of a network user. That is, a sponsor network station serves as a gateway for network users. The sponsor network station determines the identity of any user seeking authentication. This may be done by identifying information contained in an authentication request, or it could be achieved by accessing information contained elsewhere.

The sponsor station selects a mode of operation. The mode of operation is based upon the identity of the user seeking authentication. If a first mode of operation is selected, the sponsor station signs an authentication request with one private portion of an asymmetric crypto-key having a first number of private portions. If a second mode of operation is selected, the sponsor station signs an authentication request with a single private portion of an asymmetric crypto-key having a second number of private portions. The second number is greater than the first number. Thus, in determining the identity of a network user, the sponsor network station determines the number of private portions an asymmetric crypto-key associated with a given network user has, and signs an authentication request accordingly.

A system and method for generation of asymmetric crypto-keys, each having a public portion and a different number of private portions, is also provided. In a system embodiment, two processors are utilized. The processors may be any computing devices capable of effecting the operations herein described.

The first processor transmits a request for generation of an asymmetric crypto-key. The first processor may transmit a request for more than one asymmetric crypto-key, and may transmit more than one request. The second processor receives the request for asymmetric crypto-key generation and selects a mode of operation.

If the second processor selects a first mode of operation, the second processor generates an asymmetric crypto-key having a public key portion and a first number of private key portions. The first number of private key portions may one private key portion, or it may be more than one private key portion. If the second processor selects a second mode of operation, the second processor generates an asymmetric crypto-key having a public key portion and a second number of private key portions, the second number of private key portions being greater than the first number of private key portions.

According to another aspect of this embodiment, the system includes a third processor which also represents the sponsor. The third processor is preferably housed separate from the second processor. This third processor directs storage of at least one private portion of an asymmetric crypto-key. This may be either the first or second asymmetric crypto-key. This stored portion or portions is/are transmitted to the third processor by the second processor.

Beneficially, the first processor can represent either a network user or a network entity. The network user is the user with whom the generated asymmetric crypto-key is associated. The network entity is a network user other than the network user with whom the generated asymmetric crypto-key is associated. Thus, an entity other than the network user with whom the asymmetric crypto-key is associated can request generation of the asymmetric crypto-key.

According to yet another beneficial aspect of the invention, the operational mode may be determined based upon the identity of the network user associated with the first processor. This network user may or may not be the network user which whom the asymmetric crypto-key is associated.

Or, the operational mode may be determined based upon a level of security requested by a network user associated with the first processor. This network user, as above, may or may not be the user with whom the generated asymmetric crypto-key is associated. A higher level of security results in generation of a asymmetric crypto-key having a higher number of private key portions.

According to yet another aspect of the present invention, the system includes a third processor associated with a network user other than the network user with whom the generated asymmetric crypto-key is associated. This third processor may control the determination of the operational mode based upon a level of security requested by this third processor. Thus, the user with whom the generated asymmetric crypto-key is associated may have to accept a level of security determined by another network user.

BEST MODE FOR CARRYING OUT THE INVENTION

Figure 1:
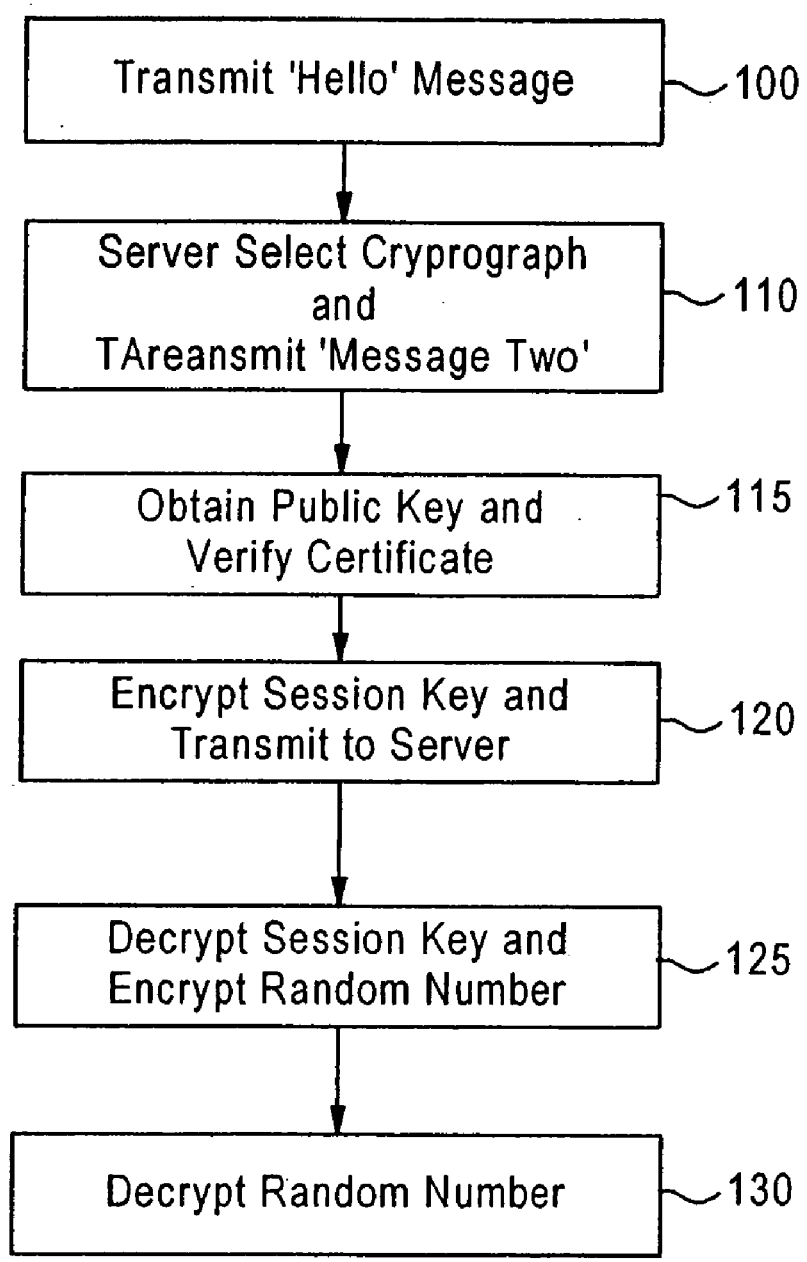
FIG. 1 is a flow chart showing the operations of a prior art cryptographic system in performing authentication of a server to a client.
Figure 2:
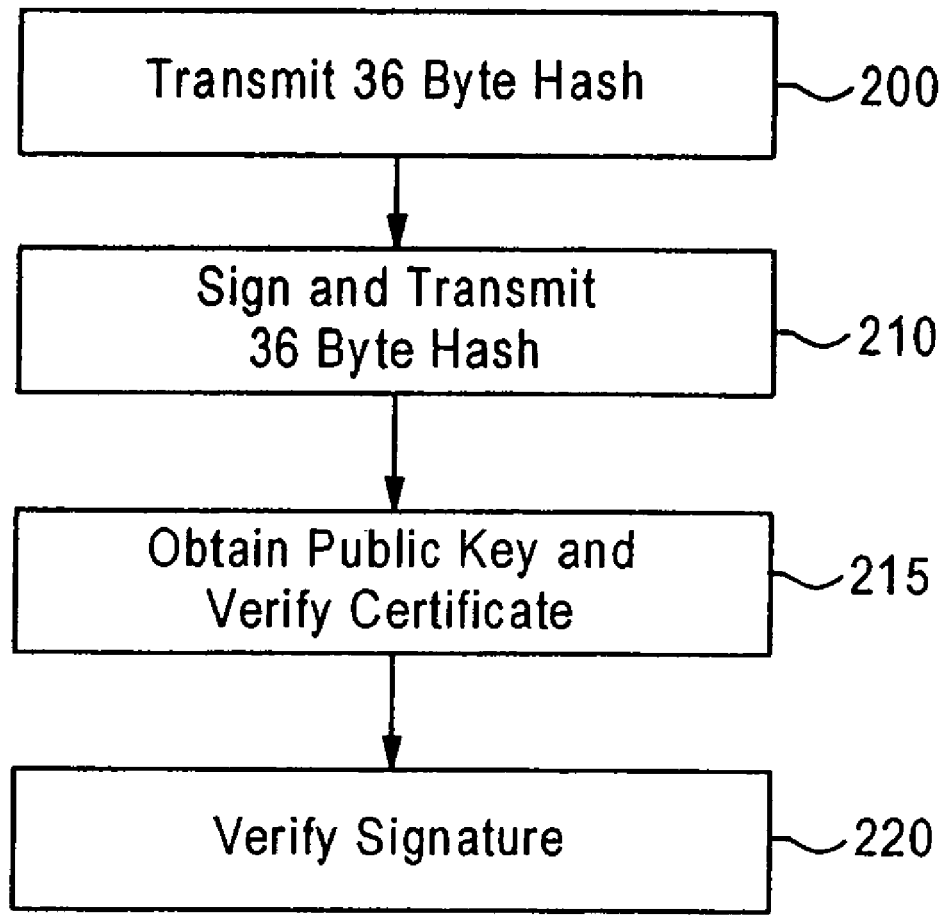
FIG. 2 is a flow chart showing the operations of a prior art cryptographic system in performing authentication of a client to a server.
Figure 3:
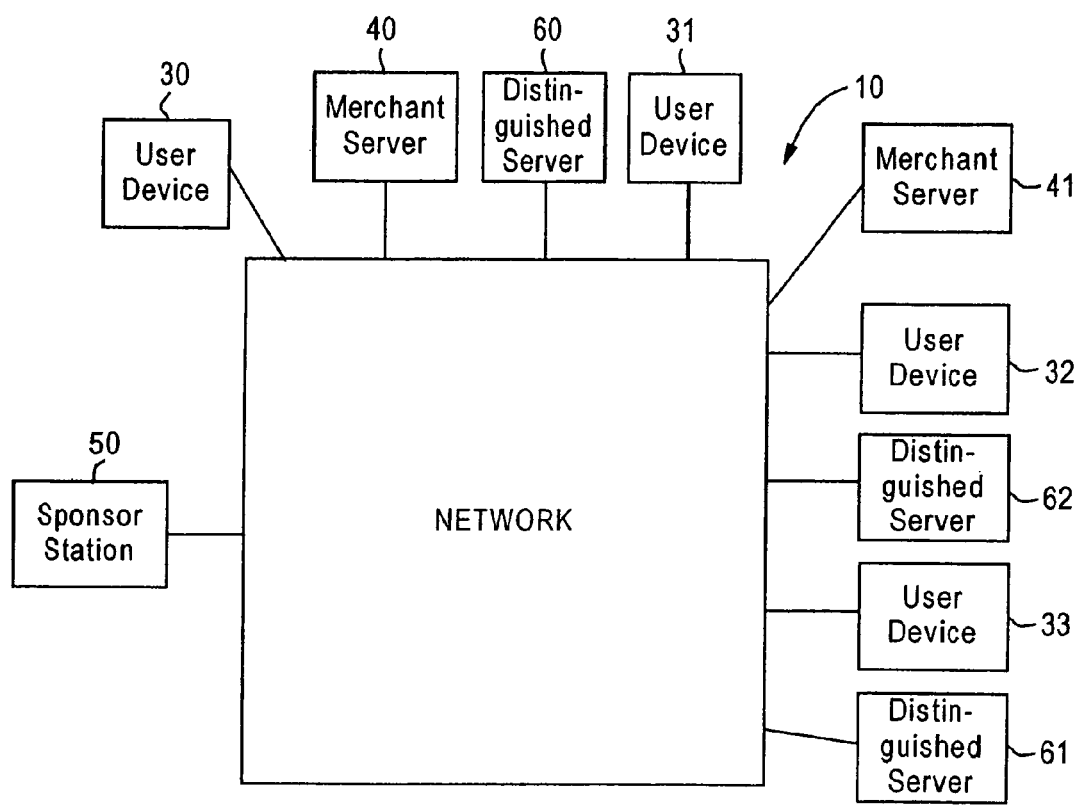
FIG. 3 depicts an exemplary network of the present invention, including networked devices of the present invention.

FIG. 3 illustrates a network 10, which could be the Internet. As shown, the network 10 is an interconnection of networked devices in communication with each other. These networked devices include networked devices 30–33 associated with individual network users, networked device 40–41 associated with a merchant network user, a sponsor station 50 associated with a sponsor, and networked devices 60–62 associated with entities known to and trusted by the sponsor.

Networked devices 30–33 will be referred to as user devices. These network devices are typically personal computers. Networked devices 40–41 will be referred to as merchant servers. Networked devices 60–62 will be referred to as distinguished servers. It will be understood that a network may consist of more networked devices than depicted in FIG. 3.

Figure 9:
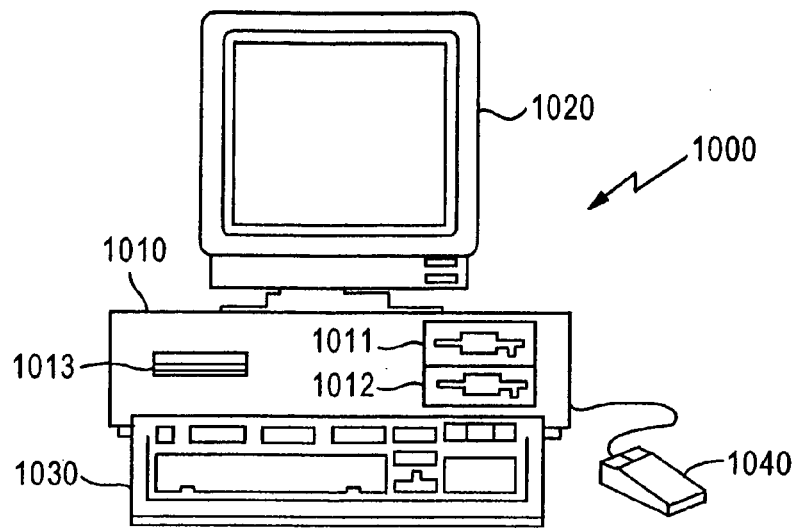
FIG. 9 depicts a computer suitable for use by a user to access a network in accordance with the invention.
Figure 10:
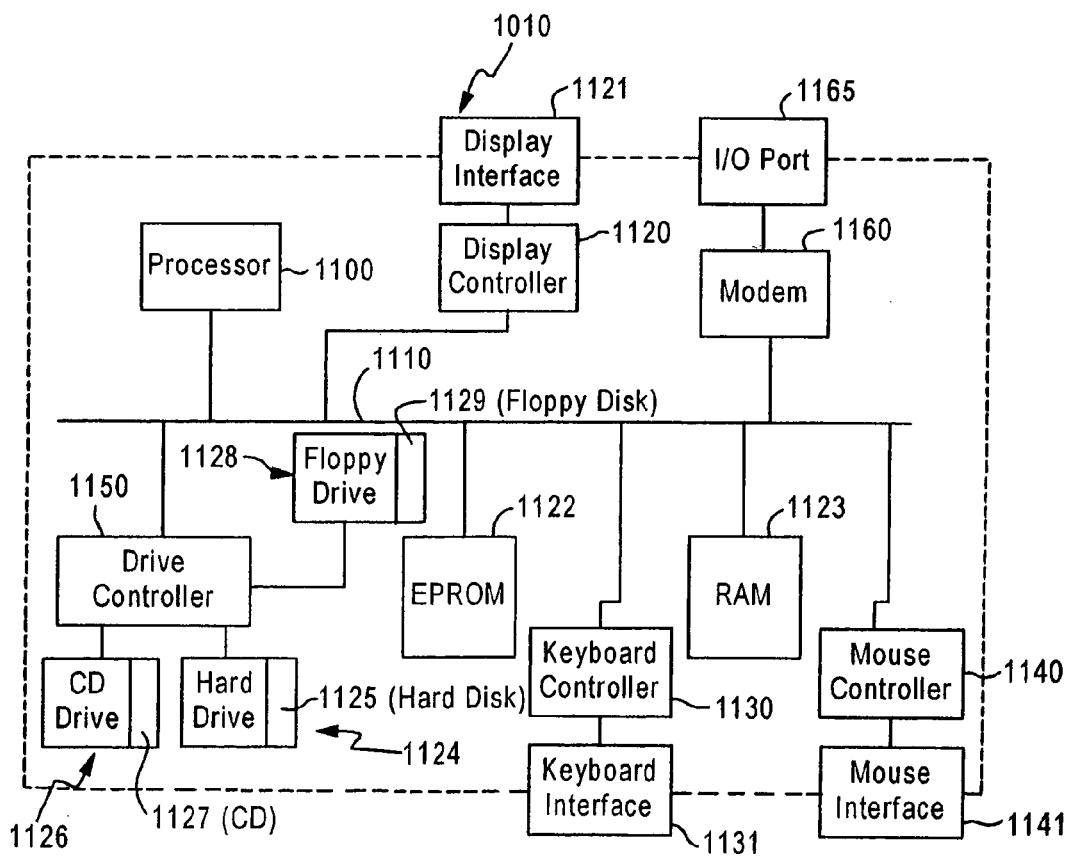
FIG. 10 is an exemplary block diagram of components of the computer depicted in FIG. 9.

FIGS. 9 and 10 depict an exemplary personal computer suitable for use by individual users to access the network 10 in the below-described invention. The computer is preferably a commercially available personal computer. It will be recognized that the computer configuration is exemplary in that other components (not shown) could be added or substituted for those depicted and certain of the depicted components could be eliminated if desired.

The computer functions in accordance with stored programming instructions which drive its operation. Preferably, the computer stores its unique programming instructions on an EPROM, or hard disk. It will be recognized that only routine programming is required to implement the instructions required to drive the computer to operate in accordance with the invention, as described below. Further, since the computer components and configuration are conventional, routine operations performed by depicted components will generally not be described, such operations being well understood in the art.

Referring to FIG. 9, the computer 1000 includes a main unit 1010 with slots 1011, 1012, and 1013, respectively provided for loading programming or data from a floppy disk and/or compact disk (CD) onto the computer 1000. The computer 1000 also includes a keyboard 1030 and mouse 1040 which serve as user input devices. A display monitor 1020 is also provided to visually communicate information to the user.

As depicted in FIG. 10, the computer 1000 has a main processor 1100 which is interconnected via bus 1110 with various storage devices including EPROM 1122, RAM 1123, hard drive 1124, which has an associated hard disk 1125, CD drive 1126, which has an associated CD 1127, and floppy drive 1128, which has an associated floppy disk 1129. The memories, disks and CD all serve as storage media on which computer programming or data can be stored for access by the processor 1100. The memory associated with a personal computer here after will collectively be referred to as Memory 1170. A drive controller 1150 controls the hard drive 1124, CD drive 1126 and floppy drive 1128. Also depicted in FIG. 10 is a display controller 1120 interconnected to display interface 1121, a keyboard controller 1130 interconnected to keyboard interface 1131, a mouse controller 1140 interconnected to mouse interface 1141 and a modem 1160 interconnected to I/O port 1165, all of which are connected to the bus 1110. The modem 1160 and interconnected I/O port 1165 are used to transmit and receive signals via the Internet 100 as described below. It will be understood that other components may be connected if desired to the bus 1110. By accessing the stored computer programming, the processor 1100 is driven to operate in accordance with the present invention.

Sponsor station 50, the merchant users and the distinguished entities are preferably represented on network 10 by an Internet server of the applicable type shown in FIGS. 11A and 11B, as will be described further below. However, here again, any network compatible device which is capable of functioning in the described manner could be substituted for the servers shown in FIGS. 11A and 11B.

Figure 11A:
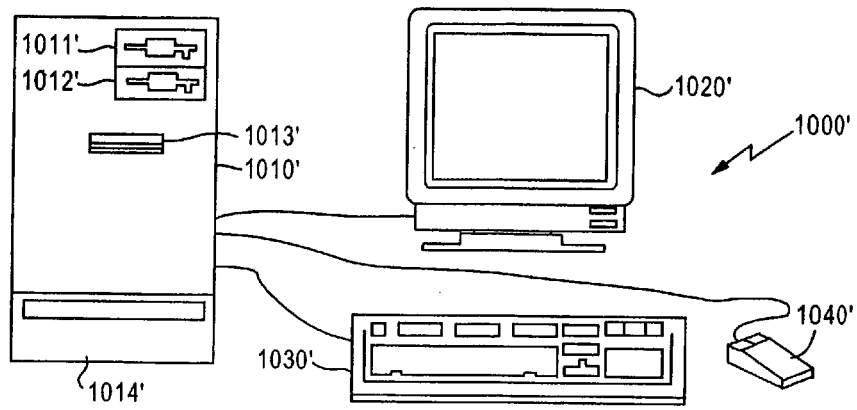
FIG. 11A depicts a server suitable for use by the sponsor station, distinguished entities, and merchants in accordance with the present invention.
Figure 11B:
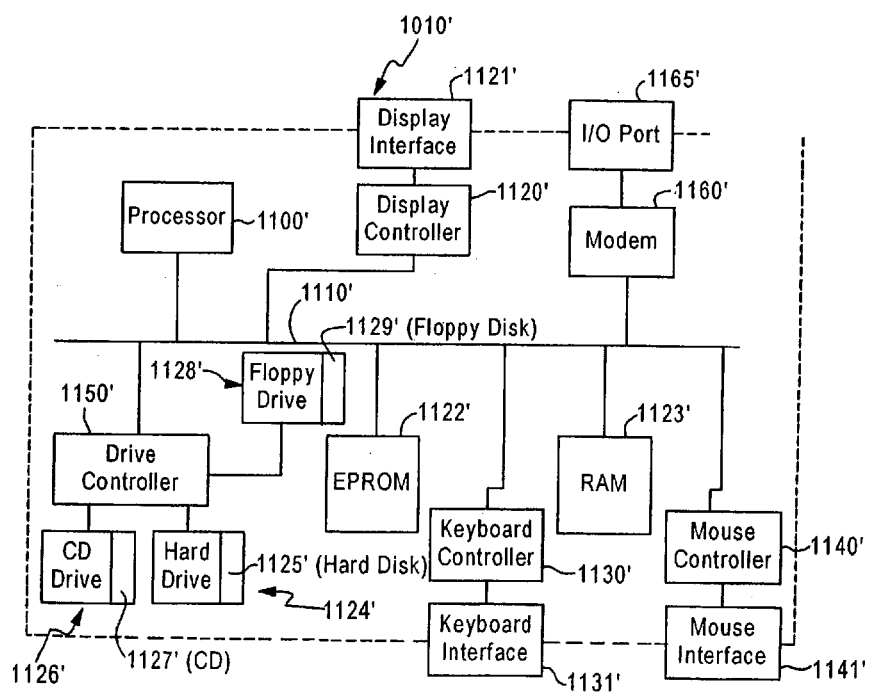
FIG. 11B is an exemplary block diagram of components of the server depicted in FIG. 11A.

FIGS. 11A and 11B depict an exemplary network server suitable for use by the sponsor, merchants, and distinguished entities to access the network 10 in the below-described invention. The server is preferably a commercially available high power, mini-computer or mainframe computer. Here again, it will be recognized that the server configuration is exemplary in that other components (not shown) could be added or substituted for those depicted and certain of the depicted components could be eliminated if desired.

The server functions as described below in accordance with stored programming instructions which drive its operation. Preferably, the server stores its unique programming instructions on an EPROM or hard disk. It will be recognized that only routine programming is required to implement the instructions required to drive the server to operate in accordance with the invention, as described below. Further, since the server components and configuration are conventional, routine operations performed by depicted components will generally not be described, such operations being well understood in the art.

Referring to FIG. 11A, the server 1000' includes a main unit 1010' with slots 1011', 1012', 1013' and 1014', respectively provided for loading programming or data from a floppy disk, CD and/or hard disk onto the server 1000'. The server 10001 also includes a keyboard 1030' and mouse 1040', which serve as user input devices. A display monitor 1020' is also provided to visually communicate information to the user.

As depicted in FIG. 11B, the server 1000' has a main processor 1100' which is interconnected via bus 1110' with various storage devices including EPROM 1122', RAM 1123', hard drive 1124', which has an associated hard disk 1125', CD drive 1126', which has an associated CD 1127', and floppy drive 1128', which has an associated floppy disk 1129'. The memories, disks and CD all serve as storage media on which computer programming or data can be stored for access by the processor 1100'. The stored data includes one or more databases containing information associated with network users. The memories associated with a server hereafter will be collectively referred to as memory 1170'. A drive controller 1150' controls the hard drive 1124', CD drive 1126' and floppy drive 11281. Also depicted in FIG. 11B is a display controller 1120' interconnected to display interface 1121', a keyboard controller 1130' interconnected to keyboard interface 1130', a mouse controller 1140' interconnected to mouse interface 1141' and a modem 1160' interconnected to I/O port 1165', all of which are connected to the bus 1110'. The modem 1160' and interconnected I/O port 1165' are used to transmit and receive signals via the network 10 as described above. It will be understood that other components may be connected if desired to the bus 1110'. By accessing the stored computer programming, the processor 1100' is driven to operate in accordance with the present invention.

An asymmetric crypto-key is associated with at least each individual network user, and each distinguished server. If desired, an asymmetric crypto-key can also be associated with each merchant user. Each asymmetric crypto-key consists of two portions, a public portion and a private portion. The public portion of each asymmetric crypto-key is known to at least each merchant user. If desired, the public portion of each asymmetric crypto-key can also be known to each individual user. Each of these public portions can be stored on each merchant server, or on each merchant server and each individual device. The private portion of each asymmetric crypto-key consists of at least a first private portion and a second private portion. The first private portion is retained by the individual or merchant user with whom the asymmetric crypto-key is associated. The first private portion of the asymmetric crypto-key will be referred to as Dxx and is derived from the user's password, as will be discussed below. The second private portion of each asymmetric crypto-key is retained by the sponsor station 50 and will be referred to as Dxs.

The asymmetric crypto-keys are used in transforming information. Preferably, the asymmetric crypto-keys are used in providing trusted authentication of an individual user to a merchant user. Also, the asymmetric crypto-keys can be used in providing trusted authentication of an individual user to another individual user, or of a merchant user to another merchant user.

In the case of providing trusted authentication of an individual user, in this instance, the individual user associated with user device 30, to a merchant user, in this instance, the merchant user associated with merchant server 40, the following operations, as shown in FIGS. 4 and 5, are performed by networked devices 30 and 40.

A communication session between user device 30 and merchant server via network 10 is established, step 401 of FIG. 4. Merchant server 40 transmits a request via network 10 to user device 30 requesting that the individual user authenticate himself or herself to the merchant user, step 410. As described above, this request typically is a request for the party being authenticated to sign a 36 bit hash provided by the authenticating party or otherwise determined by the user-merchant communication.

In response to this request, the user device 30 determines if a logged-in ticket is stored on memory 1170 at the user device 30, step 415. If so, operations continue as described below and shown at step 510 of FIG. 5a. If not, user device 30 requests the individual user to enter his or her user ID and password into the user device 30 to begin a log on protocol, step 420.

Alternatively, a user associated with an asymmetric crypto-key may contact the sponsor station 50, via the network 10, to log on prior to establishing a communications session with another network station. In this instance, processing begins with establishing a communications session between the user device and the sponsor station 50, step 405. Processing in this instance continues with step 420 as herein described.

User device 30 processes the entered password to obtain Dxx, the first private portion of the asymmetric crypto-key, step 425. Processing of the entered password to obtain Dxx is discussed below. User device 30 then transmits a log-in request to sponsor station 50, step 430. The log-in request includes at least the user's user ID. It should be understood that step 425 can occur previous to step 430, concurrent with step 430, or subsequent to step 430, though it is shown previous to step 430 in FIG. 4a.

Sponsor station 50 receives and processes the log-in request to generate a challenge to the user device 30, step 435. Use of a challenge will be understood by one skilled in the art. The challenge is transmitted to the user device 30, step 440. The login request and challenge are preferably each transmitted in the clear. That is, neither of these messages are protected. However, as will be discussed below, optional operations can be performed to protect these messages.

The user device 30 receives the challenge and generates a random number R1 and a time stamp, step 445. Preferably, R1 is a 192 bit number. Next, the user device 30 encrypts the challenge, time stamp and R1 with Dxx, forming a first encrypted message, step 450. User device 30 transmits the first message to sponsor station 50, step 451.

Sponsor station 50 decrypts the first encrypted message using the second portion of the user's private key and the user's public key to recover the challenge, time stamp and R1 , step 455. This operation authenticates the user device 30 to the sponsor station 50. If this authentication fails, that is, the challenge, time stamp and R1 are not encrypted with Dxx and therefore are unrecoverable using the second portion of the user's private key and the user's public key, sponsor station 50 transmits a notice to the user device 30 causing the user device 30 to prompt the user to reenter his or her password, and user ID, step 460, and operations continue with step 420.

If authentication is successful, the sponsor station 50 generates a second random number R2 , computes the function XOR of R1 and R2 , generates a time stamp, and determine a lifetime-value, step 465. As with R1 , R2 is preferably a 192 bit number. The lifetime-value is the life span of the logged-in ticket. This value may be a finite time period, such as 1 hour or any other finite time period so desired, or this value may be an end time such that the logged-in ticket expires upon that time being reached. Next, the sponsor station 50 encrypts R2 , the time stamp, and the lifetime-value with R1 , forming a second encrypted message, step 470. The sponsor station 50 transmits this second encrypted message to the user device 30, step 471.

The user device 30 decrypts the second encrypted message using R1 , recovering R2 , the time stamp, and the lifetime-value, step 475. This operation authenticates the sponsor station 50 to the user device 30. The user device 30 computes function XOR of R1 and R2 which is called R12 , encrypts Dxx with R1 , and then destroys R1 and the unencrypted Dxx, step 480. The user device 30 then stores the encrypted Dxx, user ID, time stamp, and the lifetime-value on memory 1170, forming the logged-in ticket, step 485. The user device 30 then transmits a message to the sponsor station 50 which includes a 'done' indication and a time stamp which are encrypted using R12 , step 490. The sponsor station 50 stores an indication in memory 1170' that the user is logged in. The user has now successfully logged in and can use the services of the sponsor station 50 to sign the 36 byte hash. As will be shown below, if the user has an unexpired logged-in ticket, the user need not provide the user's client ID or password again to provide authentication to another network station requesting authentication.

Once the user is successfully logged in, to complete the authentication of user to the merchant, the user device 30 transmits an authorization request to the sponsor station 50, step 510 of FIG. 5. The authorization request includes the user's user ID which is stored as part of the logged-in ticket on memory 1170. The user device 30 retrieves the user ID from memory 1170, the user device 30 does not prompt the user to enter the user ID. This transmission is sent using a Message Authentication Code (MAC) using R12 . As will be understood by one skilled in the art, a MACed message is not encrypted, rather it includes a number string appended to the message which authenticates the sender of the message to the receiver of the message and assures integrity of the message content. The user device 30 MACs the authorization request with R12 . The sponsor station 50 processes the received message to authenticate the user based upon the MACed message, step 515. Then, the sponsor station 50 generates and transmits an acknowledgement message to the user device 30. This is also MACed with R12 , step 516.

The user device 30 authenticates the received acknowledgment and encodes a 36 byte hash, provided by the merchant server 40, step 520. Preferably, the 36 byte hash is encoded using the PKCS1 algorithm, though other well known algorithms could be used. Next, the user device 30 encrypts the 36 byte hash and a time stamp with R12 and transmits both to the sponsor station 50, step 525.

The sponsor station 50 decrypts encoded 36 byte hash and time stamp using R12 , step 530. Next, the sponsor station 50 signs the encoded 36 byte hash with Dxs, the second private portion of the asymmetric crypto-key, step 535. The sponsor station 50 generates a fresh time stamp, recalls R1 from memory 1170', and transmits the time stamp, the signed encoded 36 byte hash, and R1 to the user device 30, all encrypted with R12, step 540.

The user device 30 decrypts the time stamp, the signed encoded 36 byte hash, and R1 using R12 , step 545. Then, the user device 30 recalls encrypted Dxx from the memory 1170 and decrypts Dxx using R1 obtained from the sponsor box 50, step 550. The user device 30 then uses Dxx to complete the signature of the encoded 36 byte hash and transmits the fully signed 36 byte hash to the merchant server 40, step 555. To complete the transaction, the user device 30 transmits a 'done' message to the sponsor station 50, step 560.

Alternately the encoded 36 byte hash could be first signed on the user device 30 using Dxx decrypted via R12 and the signature completed on the sponsor station 50 using Dxs.

It will be understood by one skilled in the art that any or all of the communications depicted in FIGS. 4a–4c and 5a–5b between the user device 30 and sponsor station 50 could include a sequence number. It also will be understood that any or all of the communications depicted in FIGS. 5a–5b could be encrypted with R12 , MACed with R12 , or both encrypted and MACed with R12 . Also, further protection of encrypted messages can be obtained by use of a Salt, which will be understood by one skilled in the art.

Figure 4A:
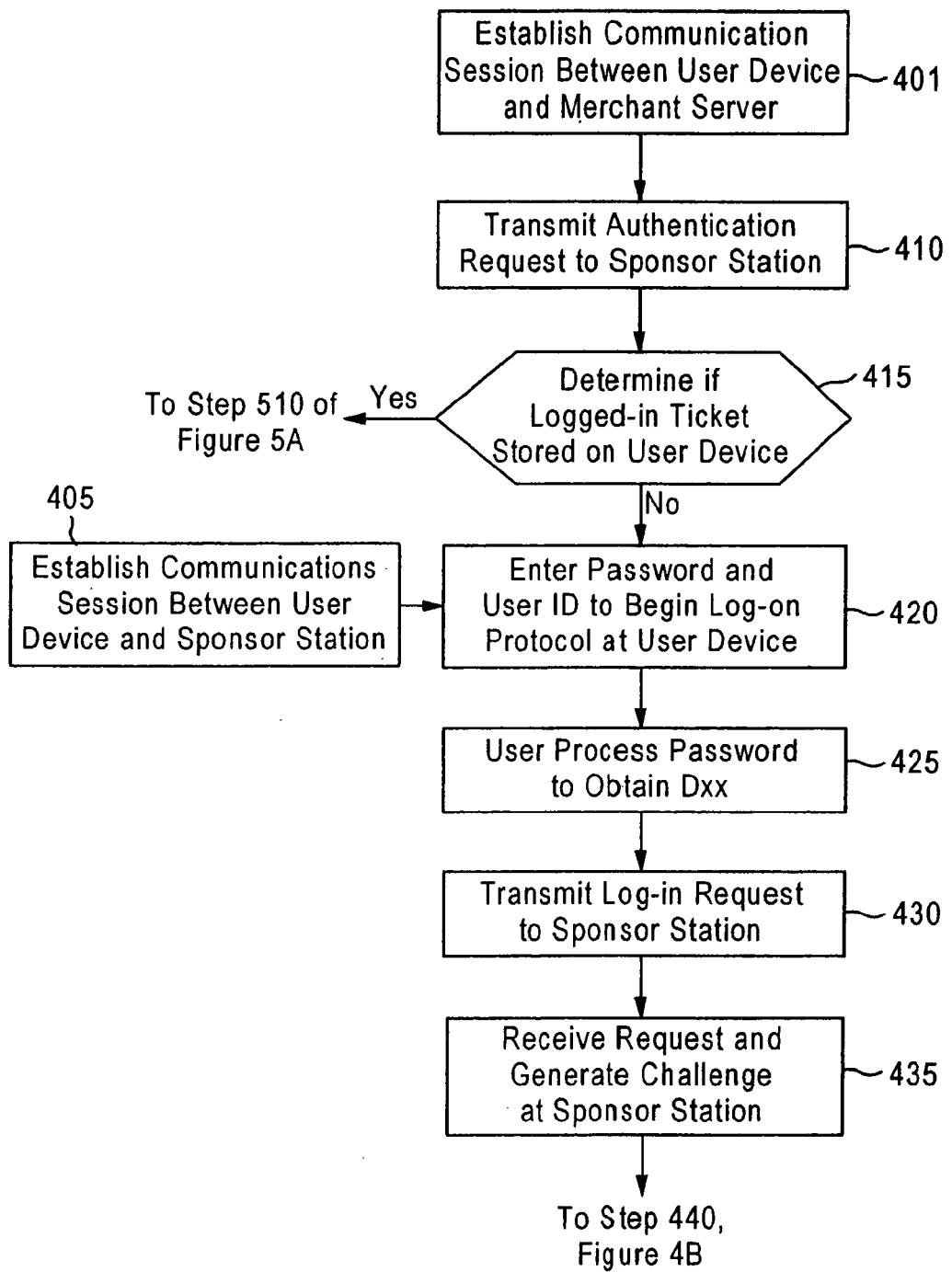
FIGS. 4a–4c is a flow chart showing the operations which are performed by a user and the sponsor station of the present invention for the user to log on with the sponsor station
Figure 4B:
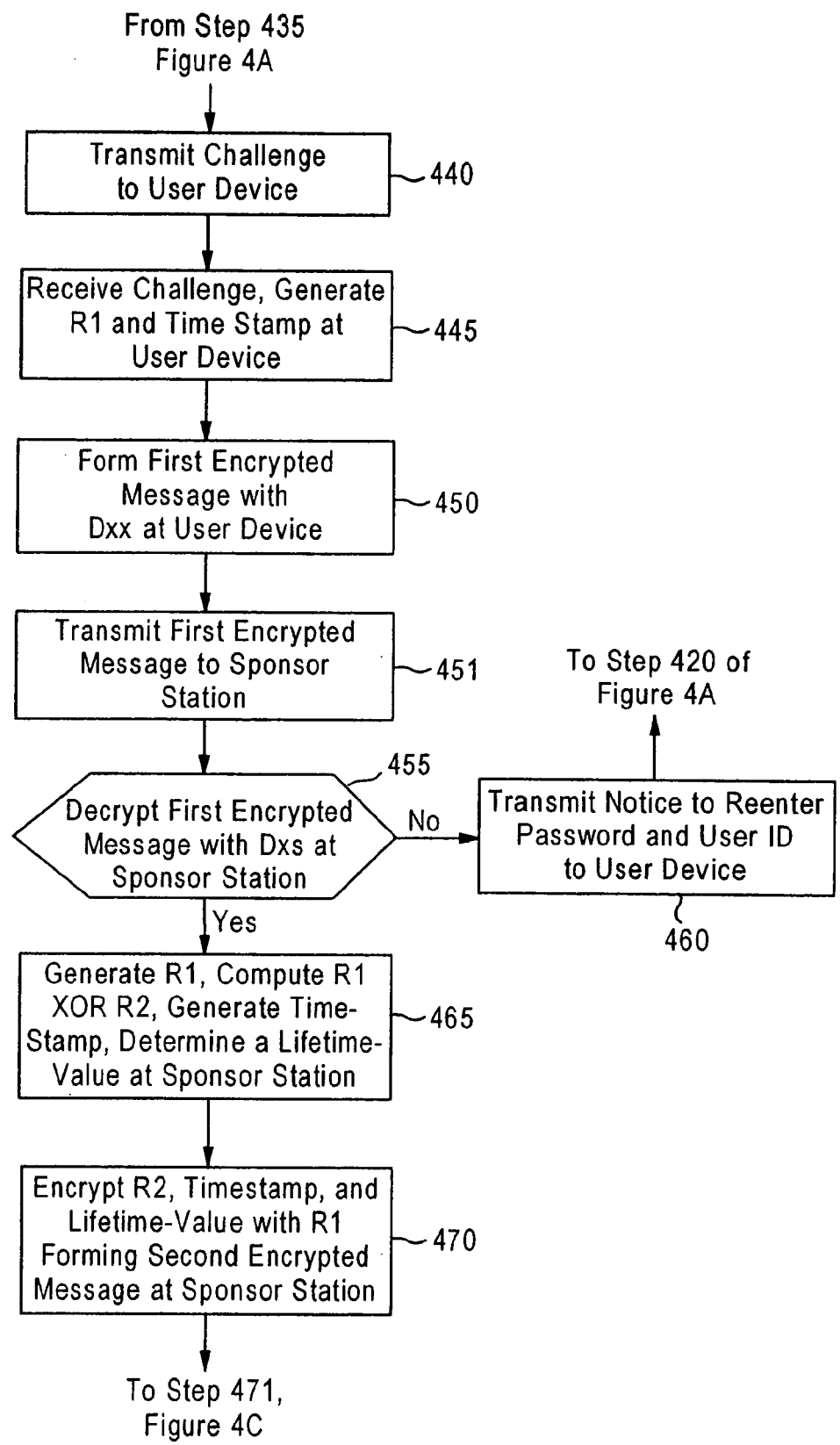
Figure 4C:
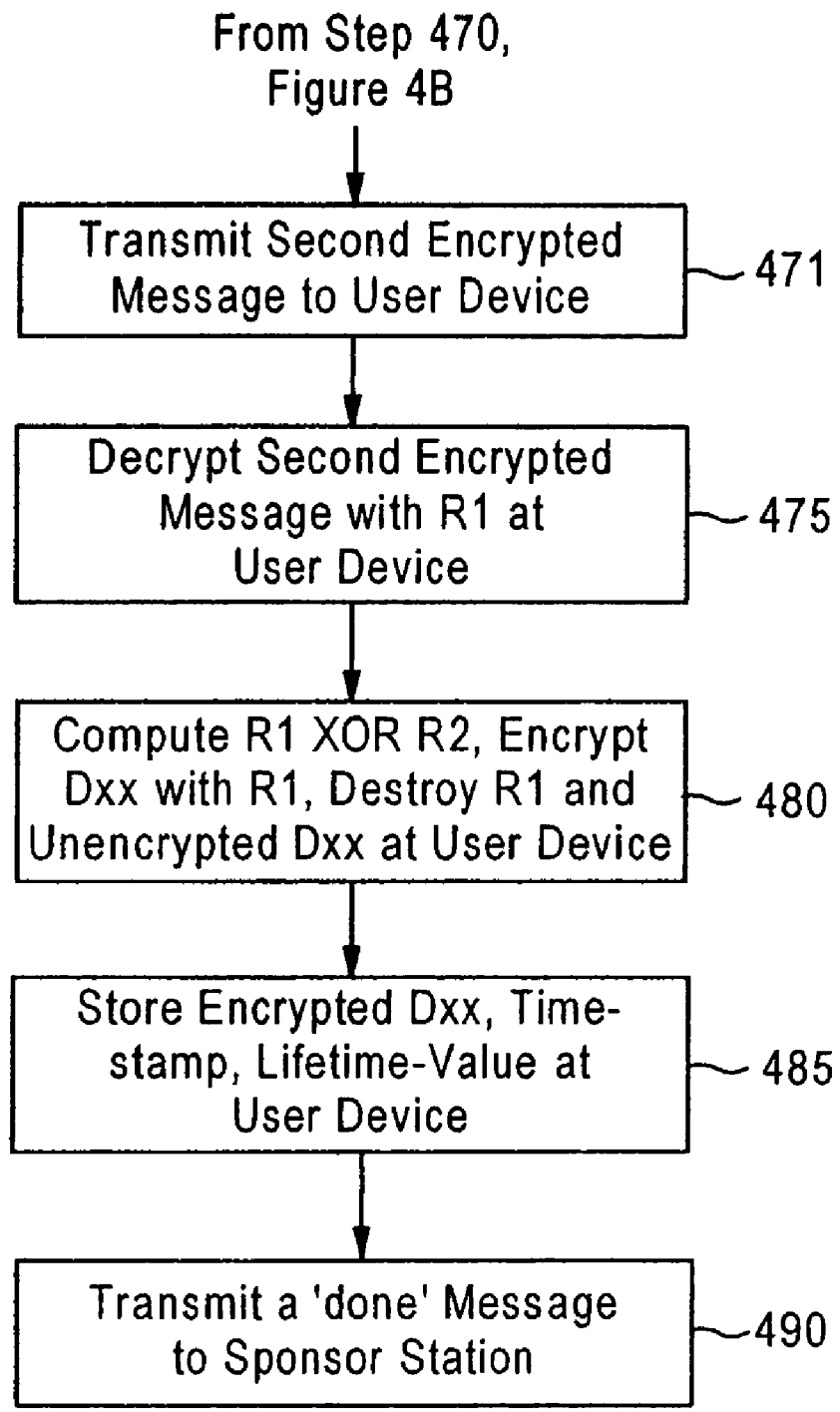
Figure 5A:
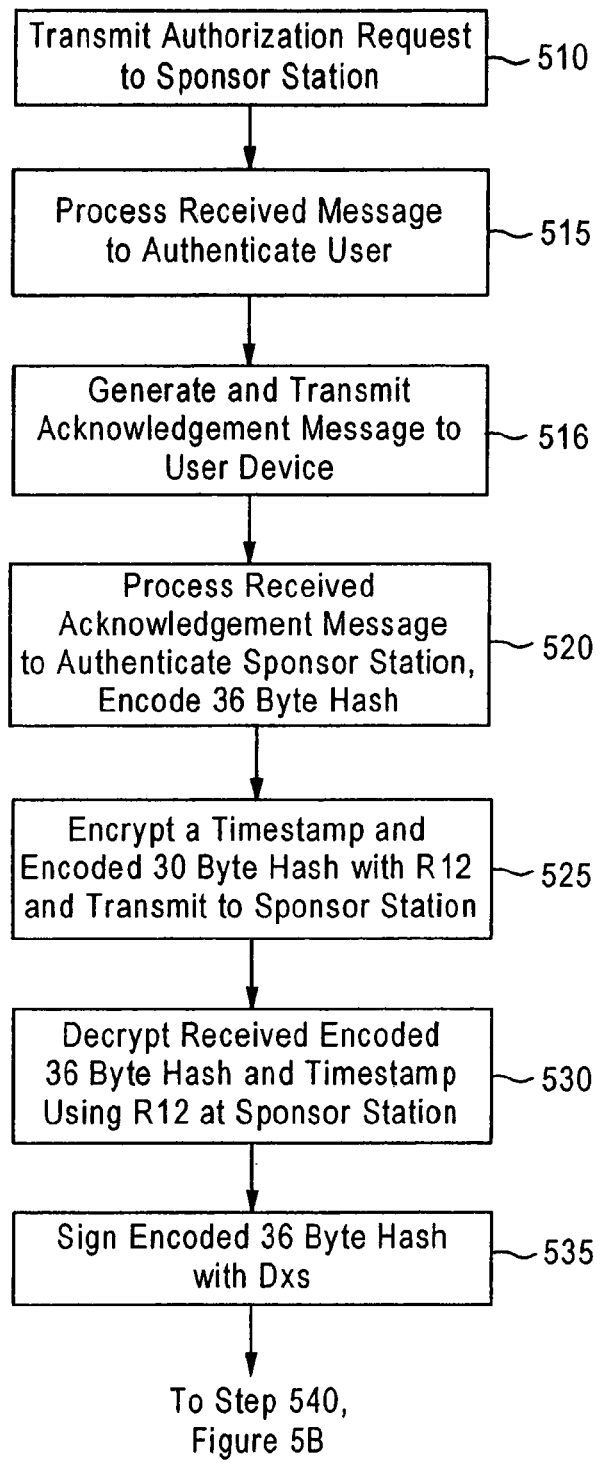
FIGS. 5a–5b is a flow chart showing the operations which are performed by a user and the sponsor station of the present invention for a user to authenticate himself or herself to a server.
Figure 5B:
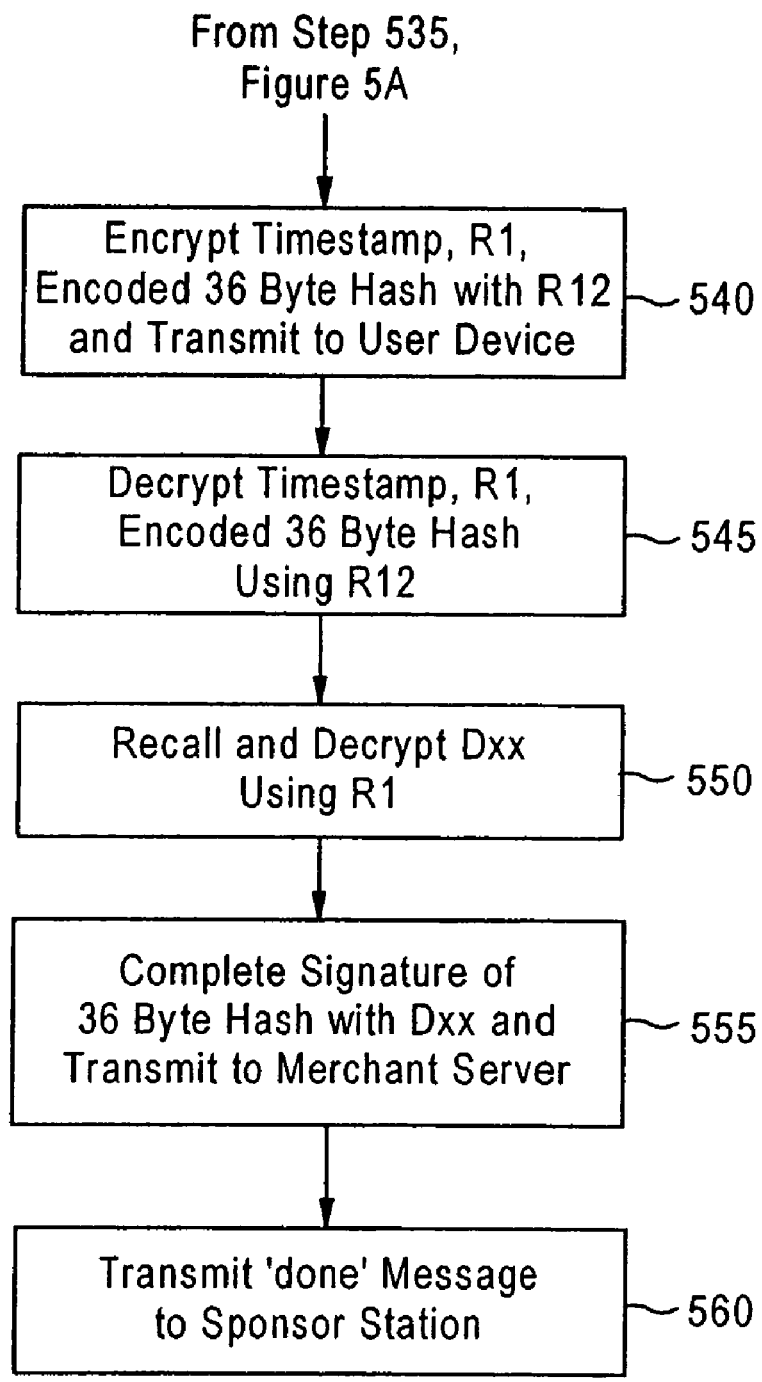

To provide trusted authentication to yet another merchant server, or perhaps to merchant server 40 at a later time, operations continue as depicted in FIG. 4a, step 401, and as discussed above. If, as depicted in step 415, the user device 30 determines that an unexpired log-in ticket is stored in memory 1170, operations continue as depicted in FIG. 5a, step 510. Thus, the user associated with network station 30 need only enter his or her user ID and password once, while the user is able to provide trusted authentication to more than one merchant user.

The sponsor station 50 is responsible for creating the association between users and asymmetric crypto-keys. For a user to obtain an association with an asymmetric crypto-key, the user must have a relationship with an entity associated with a distinguished server. A distinguished server and sponsor station 50 maintain a trusted relationship. The sponsor station 50 will provide an asymmetric crypto-key only for those users referred to it by a distinguished server.

For instance, if the individual user associated with user device 31 wishes to obtain an association with an asymmetric crypto-key, yet does not have a preexisting relationship with any distinguished server, that user may choose to contact distinguished server 60 via the network 10 and provide identity information to the distinguished server 60. In this case, the distinguished server 60 has the capabilities to verify identity information. This capability may be any well known method of verifying identify information, such as a database of credit information, a database of telephone account information, or a database of address information. If the distinguished server 60 verifies the provided information, the distinguished server 60 can refer the user to the sponsor station 50.

Figure 6A:
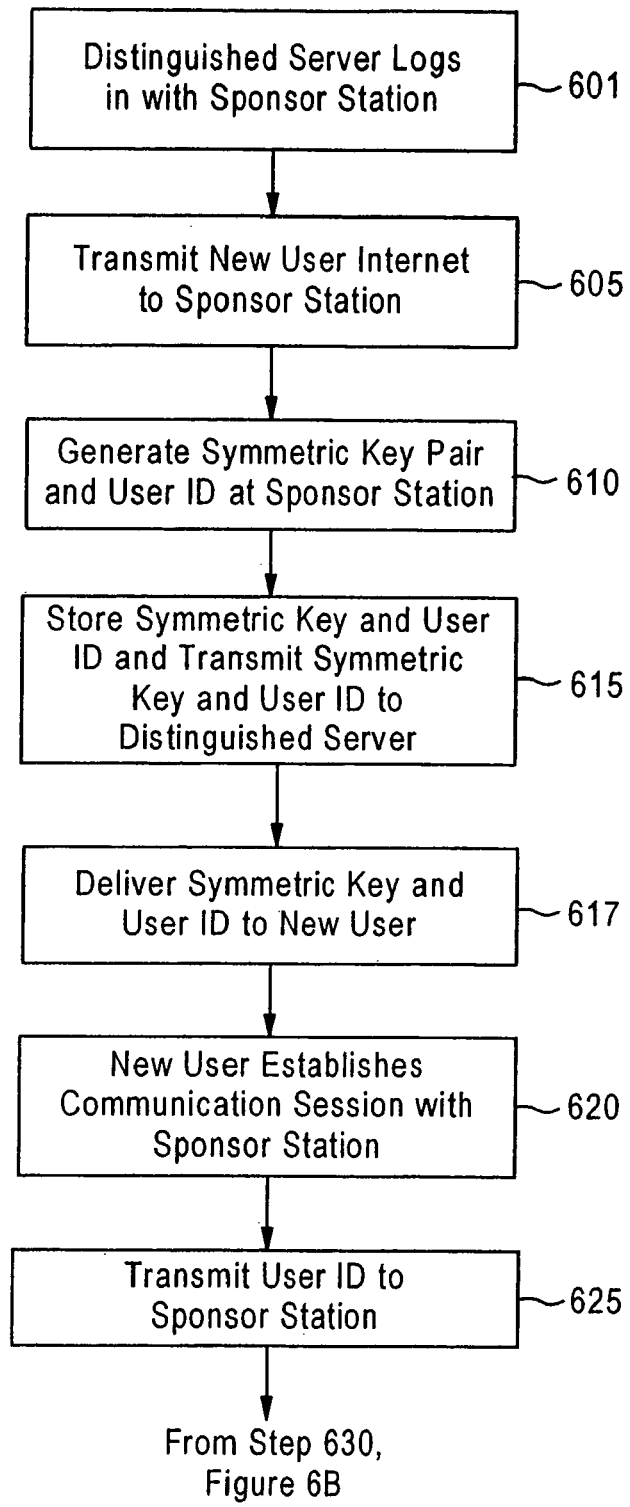
FIGS. 6a–6c is a flow chart showing the operations which are performed by a user and a distinguished server and sponsor station of the present invention in associating an asymmetric key pair with the user.
Figure 6B:
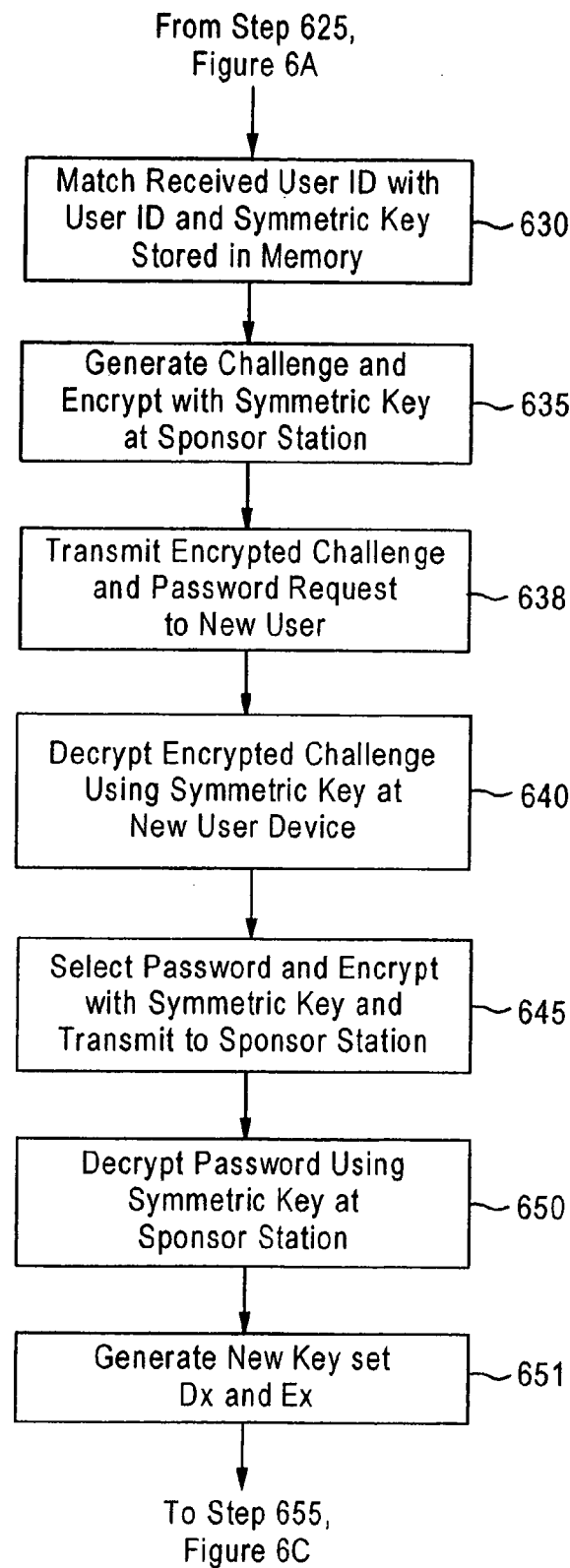
Figure 6C:
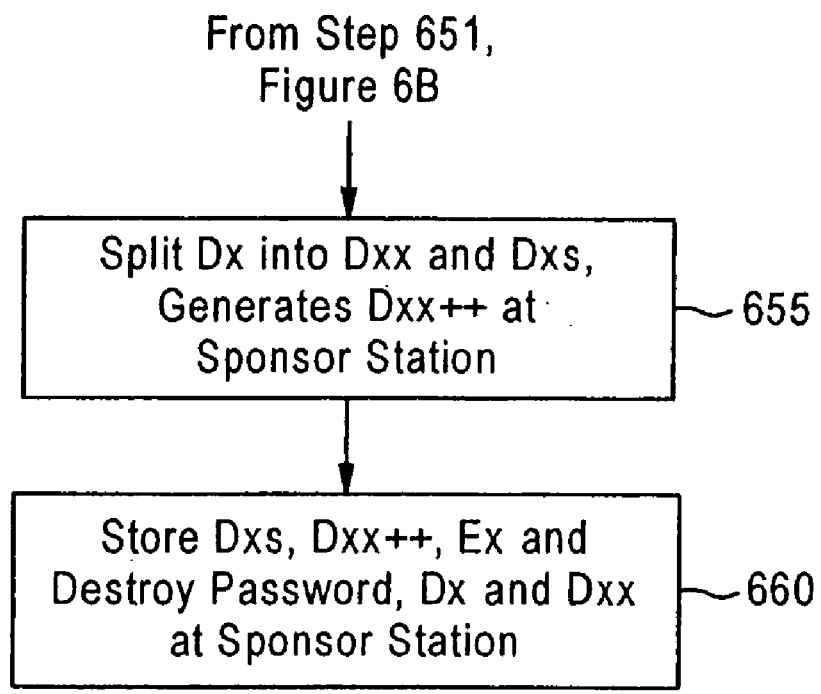

If an individual user associated with user device 32 wishes to obtain an association with an asymmetric crypto-key and has a relationship with the distinguished server 61, the individual user must request that the distinguished server 61 initiate the process of associating an asymmetric crypto-key with the individual user. Operations as described below and depicted in FIG. 6 will be performed.

Also, in yet another instance of initiation of asymmetric crypto-key association, distinguished server 62 may be associated with an entity wishing to associate an asymmetric crypto-key for each of a plurality of individuals already known to it. For instance, a merchant or bank may wish to provide to customers the opportunity to use the services of the sponsor station 50. Or, an organization may wish to provide to its members the opportunity to use the services of the sponsor station 50.

In any event, association of an asymmetric crypto-key is a three party process. As shown in step 601 of FIG. 6a, a distinguished server, in this instance distinguished server 62 logs in with the sponsor station 50, as described above. Then, the distinguished server 62 transmits to the sponsor station 50 information identifying a new user with whom an asymmetric crypto-key will be associated, in this instance the individual user associated with user device 33, step 605. The sponsor box then generates a symmetric key pair and a user ID which will be associated with the new user, step 610. This symmetric key pair will serve as a one time activation code. Preferably, the symmetric key is a short pronounceable word. This symmetric key and user ID is stored in the memory 1170' and is also transmitted to the distinguished server 62, step 615. The distinguished server 62 then causes the symmetric key and user ID to be delivered to the new user. This delivery may be via traditional postal delivery, via e-mail, or via other electronic delivery, such as via a web-page, step 617. Preferably electronic or hard-copy delivery will be secured using techniques familiar to those skilled in the art.

The new user, after receiving the user ID and symmetric key, establishes a communication session with the sponsor station 50, step 620. The new user enters the user ID into his or her user device and transmits the same to the sponsor station 50, step 625.

The sponsor station 50 matches the received user ID with the user ID and symmetric key stored in memory 1170', step 630. If the received user ID has a match, the sponsor station 50 generates a challenge and encrypts the challenge with the symmetric key/one time activation code, step 635. The sponsor box transmits the encrypted challenge and a request for the new user to select a password to the user device 33, step 638. The user device 33 decrypts the challenge using the new user's symmetric key/one time activation code, step 640.

The new user selects and enters a password which is then encrypted by the user device 33 using the symmetric key/one time activation code, and this is then transmitted to the sponsor station 50, step 645. The sponsor station 50 decrypts the password using the symmetric key/one time activation code, step 650. The sponsor station 50 generates a new key set, step 651. The new key set is keys Dx and Ex, the entire private and public portions of the asymmetric crypto-key. Then, the sponsor station 50 splits Dx into Dxx and Dxs, the first and second portions of the private portion, step 655. Computation of Dxx will be further discussed below, as well as generation of yet another key, Dxx++, which is generated after Dxx is obtained. However, it should be understood that the sponsor station 50 bases Dxx on the password. After generating the keys, the sponsor station stores Dxs, Dxx++, and Ex in the memory 1170' and destroys the password, Dxx and Dx, step 660. As a result, the user's entire private key is not stored at the sponsor station 50.

It should be noted that sponsor station 50 does not distribute or otherwise supply Dxx to any user, including the user with whom it is associated, yet the associated user will be able to transform messages using Dxx. According to the present invention, Dxx is a long key for use by a system user, yet the system user need not store this long key, obviating the problems with long keys discussed above. Furthermore, because Dxx is generated each instance it is used from a short password, a user need only memorize a short password. Thus the present invention includes not only the benefits of short keys, but the protection of long keys.

It should also be noted that when a new user establishes his or her password with the sponsor station 50, the new user is also prompted for information to be included in a certificate to be associated with the asymmetric crypto-key.

Each time a user desires to log on to the sponsor station 50, the user enters his or her password into his or her network device and the network device then computes Dxx from the password, as introduced above. This computation is a computation based upon a one way function, preferably using the PKCS-5 algorithm. A one way function is a function that it is very difficult to reverse. Thus, it is difficult, if not impossible, to take a computed Dxx and determine the password from which it was computed. The computation performed by a user's networked device to obtain Dxx is the same computation performed by the sponsor station 50 to obtain Dxx during key association. At least one one-way function is stored on memory 1170 of each networked device. Each one way function stored on a networked device is also stored on memory 1170' at the sponsor station 50.

The user password is preferably a short password which is easily remembered by the user, ideally approximately 8 characters in length. An eight character password is approximately between 56 and 72 bits in length. The one way computation takes this short password and transforms it into a long key, preferably 1024 bits long, but at least 257 bits long. Thus, the effective length of the first portion of the private key is not the bit length of the password, but the bit length of the computed Dxx. It will be recognized that advantages of generation of a long key from a short key, that is, a password, are equally beneficial to any cryptosystem, including symmetric and asymmetric cryptosystems.

The processing to obtain the long Dxx, whether it be PKCS-5 or some other processing, requires a time period for the computation to be completed. This time period, which can referred to as a system delay, serves to defend against dictionary attacks, which have been described above. For instance, if an attacker were to obtain a message M encrypted with Dxx, and even if the intruder had knowledge of the one way computation algorithm, the intruder would be required compute Dxx for each bad password in her arsenal of bad passwords and attempt to decrypt S using the Dxx obtained from each of the bad passwords. If the arsenal consisted of 40,000 bad passwords, and if the system delay to obtain Dxx is 10 seconds, at a minimum the attacker would have to invest over 111 hours of computing time to attack with each bad password in her arsenal.

The use of a computed Dxx also aids in defending against online guessing attacks for the same reason discussed above. An attacker would have to choose a user ID and a password with which to attempt to log in, establish a communication session with the sponsor station 50 and enter the selected user ID and password. The networked device the attacker is using would then have to compute Dxx from the password and transmit the same to the sponsor station 50. The added computation time in obtaining Dxx would decrease the number of guesses an attacker could attempt in any time period. As will be understood by one skilled in the art, the sponsor station 50 may be configured to allow only a limited number password attempts.

The time for completion of the one way function computation can be varied. That is, the one way computation can be made more or less complex depending upon a number of factors. This complexity may be based on the number of iterations performed by a one way computation. Or, the complexity may be varied based upon selection of the one way function.

A first factor may be the user with whom the password is associated. For instance, a system administrator's password may be required to be processed by the one way computation such that a longer time delay is introduced.

A second factor may be the password itself. For instance, a password which meets certain prescribed criteria for quality, as discussed above, may not require a complex computation, as a quality password is less likely to be vulnerable to a dictionary attack.

A third factor may be type of system being accessed. For instance, operators of a system which provides access to sensitive financial data may wish to make compromising their system's integrity very difficult, thus requiring a long system delay for password conversion.

Figure 7:
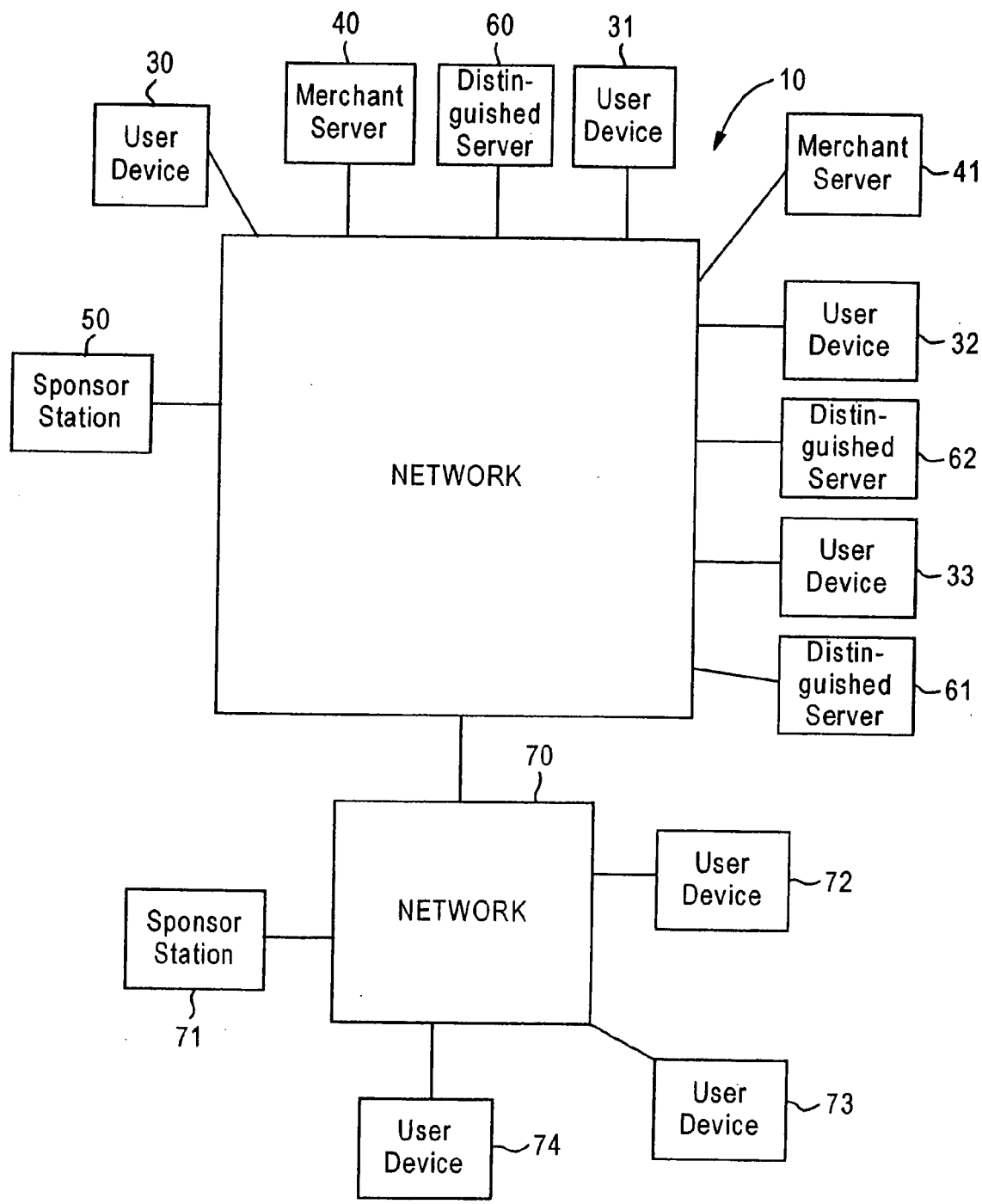
FIG. 7 depicts the exemplary network and networked devices of FIG. 1, in addition to another network, including networked devices according to the present invention present on the other network.

A fourth factor, which also focuses on the identity of the user, may be the location of the user, or networked device used by the user, seeking access to a given resource. For instance, FIG. 7 depicts the network of FIG. 3, with the addition of another network 70 in communication with network 10. The other network 70 may be an intranet, a LAN, a WAN, or any other type of network. The other network 70 includes a second sponsor station 71 and a plurality of networked devices 72–74. Sponsor station 71 may mandate a longer system delay for user devices 30–33 than for user devices 72–74, as networked devices 30–33 are not a part of the other network 70.

If the time of computation of the one way function is varied, stored on memory 1170' at sponsor station 50 is an indication of which one way function is associated with each user and/or the number of iterations of a one way function a particular user is required to perform.

The present invention also enables a user to manage his or her information with the sponsor station 50. This includes changing the password should the user so desire. This may be due to the password becoming compromised, or for any other reason. A user is also able to change, delete or otherwise modify the information included in the user's certificate. Communications between a user and the sponsor station 50 to manage user information may be encrypted with R12, due to the sensitive nature of this operation.

It should be recognized that a user, prior to accessing any given networking device, may establish a communications session with the sponsor station 50 and change, delete or otherwise modify information included in the user's certificate. After accessing the given networking device, the user can reestablish a communication session with the sponsor station 50 and once again change the information included in the certificate. Thus, a user is able to access a plurality of networking devices using the same public crypto-key, while controlling information disclosed to each networking device about the user in the user's certificate.

The key Dxx++ was introduced above. Dxx++ is a key which is obtained by performing a predetermined number of additional iterations of a one way function on a password. As an example, if five iterations of a one way function are designated to obtain Dxx, seven iterations of the same one way function may be designated to obtain Dxx++. It should be remembered that it is difficult or impossible to reverse a one way function. The Dxx++ associated with each user is stored in memory 1170' at the sponsor station 50. Dxx++ can be computed at each user's networked device from a user's password.

As discussed above, most public cryptosystems are based upon RSA. If RSA should become compromised, Dxx++ will be used to encrypt information between network users and the sponsor station 50 and between network users themselves. It will be apparent from the above discussion that Dxx++ is a shared secret symmetric key. Both the user and the sponsor station hold, or can easily obtain, Dxx++. Dxx++ provides a fall back symmetric cryptographic system.

If the sponsor station 50 determines that RSA has become compromised, the sponsor station 50 will direct that communications will be performed using symmetric key encryption. Thus, when a user establishes a communication session with the sponsor station 50, the sponsor station 50 will transmit a message to the user device causing the user device to compute Dxx++ and to encrypt all further communications with the sponsor device using Dxx++. Thus even though RSA may become compromised the sponsor station 50 and a networked device can still conduct secure communications. A user will be able to use the same password created for use in an asymmetric cryptosystem in what may become a symmetric cryptosystem. In a fall back situation, the sponsor station, which holds Dxx++ for each user, can serve as a distributing agent for symmetric keys, enabling users to have secure communications with one another. It should be understood that use of Dxx++ as a fall back scheme is applicable to any cryptosystem based upon RSA. It is also applicable to public-key cryptosystems which are not based on RSA.

Figure 8:
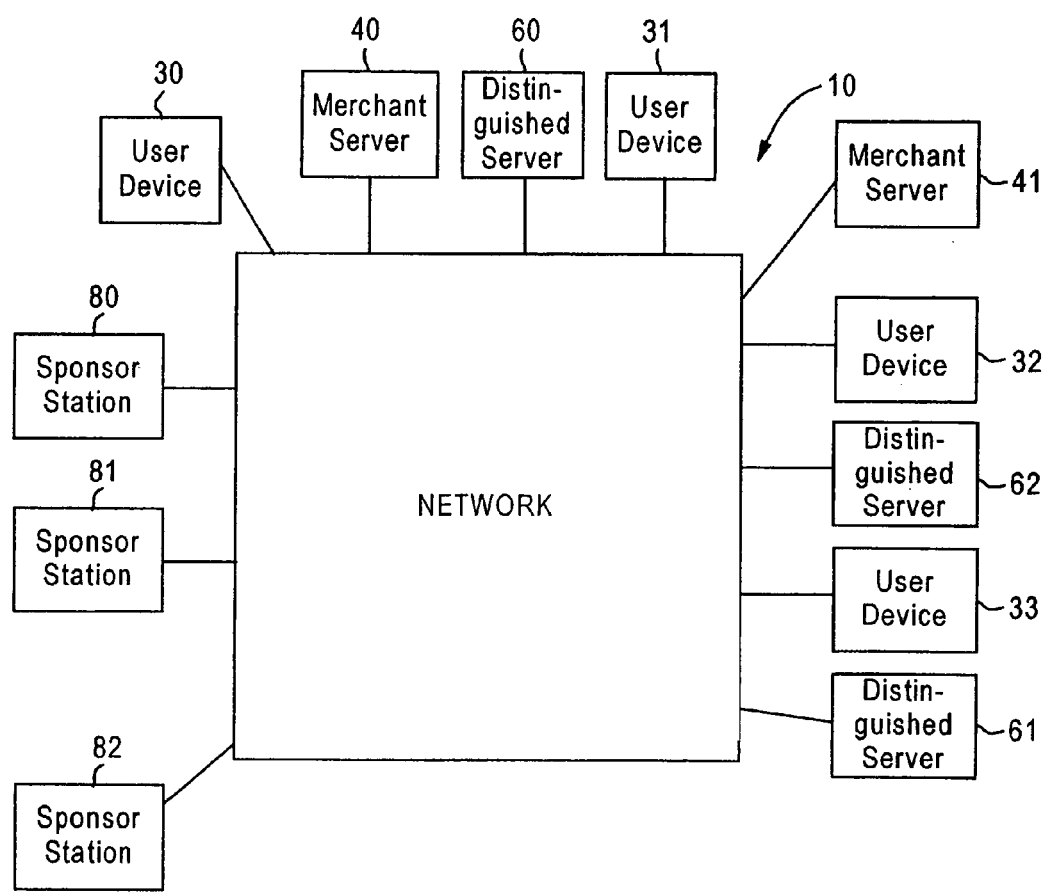
FIG. 8 depicts the exemplary network of FIG. 3, including alternative networked devices according to the present invention.

As shown in FIG. 8, the sponsor station 50 of FIG. 3 may be replaced by a plurality of sponsor stations. In this instance, 3 sponsor stations are shown, sponsor stations 80, 81, and 82. Though these sponsor stations are shown communicating with networking devices via the network 10, it should be understood that the plurality of sponsor stations may also communicate with one another via separate communications channels. Furthermore, the plurality of sponsor stations may be located in the same physical location, or they may be located in separate physical locations.

One or more sponsor stations may be used as back up for a failed sponsor station. Or, the operation of signing a 36 byte hash, as described above, may be performed by multiple sponsor stations. In such a case, alternative operations are set forth below.

In each alternative, the private key portion of the asymmetric key is split into more than two portions. That is, each of the multiple servers holds a Dxs. Thus, sponsor station 80 holds key $Dxs_1$, sponsor station 81 holds key $Dxs_2$, and sponsor station 82 holds key $Dxs_3$. In such an alternative, any one of the sponsor stations can associate the keys with users, as described above. That sponsor station then must distribute the appropriate Dxs portion to each of the other sponsor station.

In the first alternative, which could be called a parallel method, to obtain a signature on a 36 byte hash, a user device must transmit a copy of the hash to each of the multiple sponsor stations. Each station applies that sponsor station's Dxs to the hash and transmits the signed hash back to the user device. The user device then multiplies each of the signed hashes together, relying on the commutative property of RSA, and signs this result with the user's portion of the private key. The user device can then transmit the signed 36 byte hash to the requesting merchant server, as described above.

In a second alternative, authentication of the user to each of the multiple sponsor stations can be provided. In this alternative a temporary shared secret key is established between the multiple sponsor stations and the user.

A user initiates a log-in with any of the multiple sponsor stations as described above, and in this instance with sponsor station 80. The sponsor station 80 generates a challenge C1 and signs C1 with a private key associated with sponsor station 80. This private key is verifiable by each of the other sponsor stations. That is, they each have the corresponding public key. Then, sponsor station 80 encrypts the challenge with its portion of the user's private key. The sponsor station 80 also encrypts a copy of C1 with the public key of sponsor station 81 and encrypts a copy of C1 with the public key of sponsor station 82. The sponsor station 80 then transmits C1 to the appropriate other sponsor station. Sponsor station 81 obtains C1 using its private key, and sponsor station 82 obtains C1 using its private key. At this point, each of the sponsor stations knows C1.

Sponsor station 80 encrypts C1 with its portion of the user's private key and transmits the same to the user device. Sponsor station 81 encrypts C1 with its portion of the user's private key and transmits the same to the user device. And, sponsor station 82 encrypts C1 with its portion of the user's private key and transmits the same to the user device. The user device then multiplies each of the received encrypted C1s together and then recovers C1 using the user's portion of the private key. C1 can than be used as a shared secret key between the user and the sponsor stations. Thus, by demonstrating knowledge of C1, the user device can authenticate itself to each of the multiple sponsor stations. The user can then obtain the required signatures from each of the multiple sponsor stations, such communications being protected by C1.

In a third alternative, which could be called a series alternative, to obtain a signature on a 36 byte hash, a user device transmits the 36 byte hash to a sponsor station 80, sponsor station 80 in this example. That sponsor station signs the hash and forwards it to sponsor station 81. Sponsor station 81 signs the hash and forwards it sponsor station 82. Sponsor station 82 signs the hash and returns it to the user. The user then applies his portion of the private key to the hash and transmits it to a merchant server.

This second alternative can be modified. The user could first be required to sign the hash and then forward it to sponsor station 80. Operations continue at sponsor station 80 as described above. After sponsor station 82 signs the hash, the hash would have a complete private portion. The sponsor station 82 could verify the signature by using the user's public key. This adds an additional element of authentication to the process.

It will also be recognized by those skilled in the art that, while the invention has been described above in terms of one or more preferred embodiments, it is not limited thereto. Various features and aspects of the above described invention may be used individually or jointly. Further, although the invention has been described in the context of its implementation in a particular environment and for particular purposes, e.g. in providing security for Internet communications, those skilled in the art will recognize that its usefulness is not limited thereto and that the present invention can be beneficially utilized in any number of environments and implementations. Accordingly, the claims set forth below should be construed in view of the full breath and spirit of the invention as disclosed herein.

The invention claimed is:

1. A system for authenticating network users, the system operable in multiple modes, comprising:
    a plurality of user network stations, each representing a user, and each associated with an asymmetric crypto-key having a public/private key pair, with the private key of each public/private key pair having one of a first number of private key portions and a second number of private key portions, the second number of private key portions being greater than the first number of private key portions; and
    at least one sponsor network station representing a sponsor and configured to (i) receive a plurality of authentication requests from the plurality of user network stations, (ii) determine the identity of the user represented by the user station from which each of the plurality of authentication requests is received, (iii) select one of at least a first mode of operation and a second mode of operation based upon the determined identity of the represented user, and (iv) if the first mode of operation is selected, sign the authentication request received from the applicable user network station using one portion of the private key of an asymmetric crypto-key associated with the applicable user station, wherein the private key has the first number of private key portions, and if the second mode of operation is selected, sign the authentication request received from the applicable user network station using one portion of the private key of an asymmetric crypto-key associated with the applicable user station, wherein the private key has the second number of private key portions.

2. A system for generating asymmetric crypto-keys associated with network users, operable in multiple modes, comprising:
    a first processor configured to transmit a request for generation of an asymmetric crypto-key; and
    a second processor configured to (i) receive the request for generation of an asymmetric crypto-key, (iii) select one of at least a first operational mode and a second operational mode responsive to the received request, (iv) generate an asymmetric crypto-key having a public/private key pair with (a) the private key split into a first number of private key portions if the second processor selected the first mode of operation, and (b) the private key split into a second number of private key portions, the second number of private key portions being greater than the first number of private key portions, if the second processor selected the second mode of operation.

3. The system according to claim 2, further comprising:
    a third processor representing a sponsor and configured to direct storage of at least one private key portion of an asymmetric crypto-key;
    wherein the second processor is further configured to transmit at least one of the private key portions of the generated asymmetric crypto-key to the third processor for storage.

4. The system according to claim 2, wherein the first processor represents one of (i) a network user with whom the generated asymmetric crypto-key is associated, and (ii) a network entity other than the network user with whom the generated asymmetric crypto-key is associated.

5. The system according to claim 2, wherein the operational mode is selected by the second processor based upon the identity of a network user associated with the first processor.

6. The system according to claim 2, wherein the operational mode is selected by the second processor based upon a level of security requested by a network user associated with the first processor.

7. The system according to claim 2, further comprising:
    a third processor representing a network user other than a network user with whom the generated asymmetric crypto-key is associated;
    wherein the operational mode is selected by the second processor based upon a level of security requested by the third processor.

8. A method of authenticating network users in which each network user is associated with an asymmetric crypto-key having a public key and a private key, comprising:
    receiving an authentication request from a network user;
    determining the identity of the network user;
    selecting one of at least a first mode of operation and a second mode of operation based upon the determined identity of the network user;
    if the first mode of operation is selected, signing the authentication request with one portion of the private key of an asymmetric crypto-key associated with the identified network user, wherein the private key has a first number of private key portions selected; and
    if the second mode of operation is selected, signing the authentication request with one portion of the private key of an asymmetric crypto-key associated with the identified network user, wherein the private key has a second number of private key portions, the second number being greater than the first number.

9. A method for generating an asymmetric crypto-key associated with a network user, comprising:
    receiving a request for generation of an asymmetric crypto-key;

selecting one of at least a first operational mode and a second operational mode responsive to the received request; and generating an asymmetric crypto-key having a public key and a private key, with (i) the private key split into a first number private key portions if the first operational mode is selected, and (ii) the private key split into a second number of private key portions if the second operational mode is selected, the second number of private key portions being greater than the first number of private key portions.

10. The method according to claim 9, further comprising:

transmitting one of the private key portions of the generated asymmetric crypto-key to a network user other than a network user with whom the generated asymmetric crypto-key is associated.

11. The method according to claim 9, wherein the operational mode is selected based upon an identity of a network user with whom the generated asymmetric crypto-key is associated.

12. The method according to claim 9, wherein the operational mode is selected based upon a level of security requested by a network user with whom the generated asymmetric crypto-key is associated.

13. The method according to claim 9, wherein:

the request for generation of an asymmetric crypto-key is received from a network user with whom the generated asymmetric crypto-key is associated; and the operational mode is selected based upon a level of security requested by a network user other than the network user with whom the generated asymmetric crypto-key is associated.

* * * * *